US007481445B1

(12) United States Patent
Danziger

(10) Patent No.: US 7,481,445 B1
(45) Date of Patent: Jan. 27, 2009

(54) COMBINATION WALKER AND WHEELCHAIR WITH IMPROVED ERGONOMIC DESIGN

(75) Inventor: Robert Danziger, Carmel, CA (US)

(73) Assignee: Carmel Highland Inventions, LLC, Carmel, CA (US)

( * ) Notice: Subject to any disclaimer, the term of this patent is extended or adjusted under 35 U.S.C. 154(b) by 518 days.

(21) Appl. No.: 11/392,912

(22) Filed: Mar. 28, 2006

(51) Int. Cl.
*B62B 3/02* (2006.01)

(52) U.S. Cl. .................... 280/648; 280/250.1; 280/642; 280/650

(58) Field of Classification Search ................... 280/42, 280/47.36, 87.014, 87.051, 250.1, 304.1, 280/642, 643, 647, 648, 650; 297/93; 135/67
See application file for complete search history.

(56) References Cited

U.S. PATENT DOCUMENTS 2,312,602 A 3/1943 Taylor
3,708,182 A * 1/1973 Markiel ................. 280/288.41
4,759,562 A * 7/1988 Vinyard et al. ........... 280/304.1
5,058,912 A 10/1991 Harroun
5,060,967 A * 10/1991 Hulterstrum ................ 280/650
D326,250 S 5/1992 Oliver
5,112,069 A 5/1992 Aldus
5,224,731 A 7/1993 Johnson
5,320,122 A 6/1994 Jacobson
5,451,193 A * 9/1995 Pickard ....................... 482/68
D365,785 S 1/1996 Sawyer
5,558,358 A 9/1996 Johnson
5,605,345 A * 2/1997 Erfurth et al. ............ 280/250.1
5,716,063 A 2/1998 Doyle
5,741,020 A 4/1998 Harroun
5,778,996 A * 7/1998 Prior et al. ................. 180/65.1
5,944,338 A * 8/1999 Simpson ..................... 280/650
6,113,128 A * 9/2000 Watkins ...................... 280/647
6,338,493 B1 1/2002 Wohlgemuth
6,340,168 B1 1/2002 Woleen
6,378,883 B1 * 4/2002 Epstein .................... 280/250.1
6,494,469 B1 12/2002 Hara
6,659,478 B2 12/2003 Hallgrimsson
6,921,101 B1 7/2005 Lauren (Continued)

FOREIGN PATENT DOCUMENTS

EP 1092411 4/2001

(Continued)

*Primary Examiner*—Paul N Dickson
*Assistant Examiner*—Marc A Scharich
(74) *Attorney, Agent, or Firm*—Thomas I. Rozsa

(57) ABSTRACT

The present invention is a combination walker and wheelchair which enables a person with back problems and other physical disabilities to walk from one location to another without assistance from a third person with correct walking posture and arm movement, thereby allowing long walks versus crutches of current design and also enables the person to comfortably sit in the chair in spite of the person's back pains. The ergonomically friendly design includes a high level transverse bar which enables the invention to be pushed by a person's hands, arms and chest or enables the person to lean against the invention; a foldable main structural frame; a detachable back support and seat; and rotatable wide armrests made with compressive materials thereby allowing the chair structure the maximum width to get through standard doors and still have even wider comfortable armrests. Therefore, the present invention can be used as a walker, a wheelchair, a transportation chair, a golf trolley, and a spectator chair.

46 Claims, 18 Drawing Sheets

U.S. PATENT DOCUMENTS

| | | | |
|---|---|---|---|
| 2003/0006578 | A1 | 1/2003 | Melgarejo |
| 2005/0057021 | A1 | 3/2005 | Miyoshi |
| 2005/0156395 | A1 | 7/2005 | Bohn |

FOREIGN PATENT DOCUMENTS

| | | |
|---|---|---|
| EP | 1516609 | 3/2005 |
| WO | WO95/31169 | 11/1995 |

* cited by examiner

COMBINATION WALKER AND WHEELCHAIR WITH IMPROVED ERGONOMIC DESIGN

BACKGROUND OF THE INVENTION

1. Field of the Invention

The present invention relates to the field of physical assistance apparatus to assist people who have back problems and other physical disabilities to enable them to walk better, to facilitate more comfortable seating, and to enable the person to move form one location to another without assistance from a third party.

2. Description of the Prior Art

In general, devices to assist a person with disabilities to walk from one location to another or to support the person in a seated condition are known in the prior art. The following 21 patents and published patent applications are the closest prior art references to the present invention unique walking chair.

1. U.S. Pat. No. 2,312,602 issued to Judson O. Taylor on Mar. 2, 1943 for "Walking And Rolling Chair" (hereafter the "Taylor Patent");

2. U.S. Pat. No. 5,058,912 issued to Mary M. Harroun on Oct. 22, 1991 for "Combination Chair/Walker" (hereafter the "'912 Harroun Patent");

3. U.S. Pat. No. 5,112,069 issued to Richard E. Aldus et al. on May 12, 1992 for "Travel-Air Chair" (hereafter the "Aldus Patent");

4. U.S. Design Pat. Des. 326,250 issued to Beverly J. Oliver on May 19, 1992 for "Combined Wheel Chair And Walker" (hereafter the "'250 Oliver Design Patent);

5. U.S. Pat. No. 5,224,731 issued to Candace L. Johnson on Jul. 6, 1993 for "Combination Wheel Chair And Walker" (hereafter the "'731 Johnson Patent");

6. U.S. Pat. No. 5,320,122 issued to Julius H. Jacobson, II et al. on Jun. 14, 1994 for "Combined Walker And Wheelchair" (hereafter the "Jacobson Patent");

7. U.S. Design Pat. No. 365,785 issued to James O. Sawyer on Jan. 2, 1996 for "Walker" (hereafter the "Sawyer Design Patent");

8. U.S. Pat. No. 5,558,358 issued to Candace L. Johnson on Sep. 24, 1996 for "Combination Wheelchair And Walker" (hereafter the "'358 Johnson Patent");

9. U.S. Pat. No. 5,716,063 issued to Brian Peter Doyle et al. on Feb. 10, 1998 for "Walking Aid" (hereafter the "Doyle Patent");

10. U.S. Pat. No. 5,741,020 issued to Mary M. Harroun on Apr. 21, 1998 for "Collapsable Combination Chair Walker" (hereafter the "'020 Harroun Patent");

11. U.S. Pat. No. 6,338,493 issued to Eli Wohlgemuth et al. on Jan. 15, 2002 for "Walker Chair" (hereafter the "Wohlgemuth Patent");

12. U.S. Pat. No. 6,340,168 issued to Norman Woleen on Jan. 22, 2002 for "Convertible Chair And Walker Assembly" (hereafter the "Woleen Patent");

13. U.S. Pat. No. 6,494,469 issued to Yasunori Hara et al. on Dec. 17, 2002 for "Rolling Walker" (hereafter the "Hara Patent");

14. U.S. patent application Publication No. 2003/0006578 issued to Mauricio Melgarejo et al. published on Jan. 9, 2003 for "Size-Adjustable Laterally-Folding Tilting-Frame Wheelchair" (hereafter the "Melgarejo Published Patent Application");

15. U.S. Pat. No. 6,659,478 issued to Bjarki Hallgrimsson et al. on Dec. 9, 2003 for "Combination Walker And Transport Chair" (hereafter the "Hallgrimsson Patent");

16. U.S. patent application Publication No. 2005/0057021 issued to Etsuo Miyoshi published on Mar. 17, 2005 for "Wheelchair Useable As Walking Stick" (hereafter the "Miyoshi Published Patent Application");

17. U.S. Pat. No. 6,921,101 issued to Givi Lauren et al. on Jul. 26, 2005 for "Combined Wheelchair, Walker, And Sitting Chair" (hereafter the "Lauren Patent");

18. European Patent Application No. EP 1,092,411 issued to Yasunori Hara et al. on Apr. 18, 2001 for "Rolling Walker" (hereafter the "Hara European Patent Application");

19. European Patent Application No. EP 1,516,609 issued to Etsuo Miyoshi on Mar. 23, 2005 for "Wheelchair Useable As Walking Stick" (hereafter the "Miyoshi European Patent Application");

20. PCT Published Patent Application No. WO 95/31169 issued to Jimmy Grotner et al. published on Nov. 23, 1995 for "Combination Wheelchair And Walker" (hereafter the "Grotner PCT Published Patent Application");

21. U.S. Published patent application 2005/0156395 A1 for a "Rolling Walker With Arm Rest Platforms" applied for by David L. Bohn and which was published on Jul 21, 2005.

The Taylor Patent issued in 1943 discloses a walker. It is essentially a conventional walker which does have a wide handlebar (55) but it is not positioned so that it would be viable to use to push the chair with a person's chest as a walker.

The '912 Harroun Patent is a "Combination Chair And Walker" but the walking portion is in the front of a user and the user is walking by pushing the chair between the seat and the front pull where the user is able to push the chair and walk. The user can also sit in the chair and move it with the user's feet.

The Aldus Patent discloses the concept of having a "Travel-Air Chair" which can be more easily disassembled and stowed. The backrest does not function as a device to enable a user to push the chair with the user's chest.

The '250 Oliver Design Patent is a design patent which protects the shape of this particular chair.

The '731 Johnson Patent discloses a "Combination Wheel Chair And Walker". It functions as a walker in that someone can walk behind the device and there are hand grips (37 and 38) by which the chair can be stopped either by someone pushing a person seated in the chair or by the person themselves using the chair as a walker. However, a bar (25) across the back is not wide enough so that the bar does not really function as a leaning bar. The patent also discloses arm bars but they are not padded and they are not adjustable and rotatable.

The Jacobson Patent discloses a "Combined Walker And Wheelchair". In this patent the portion that is used as a walker is the arm bar (30) which has adjustable supporting members (32 and 28) so that the height can be adjusted to the person's desired height. There is also the seat (40) so the person can sit on it and presumably be pulled from the front or pushed from the back.

The Sawyer Patent is also a design patent that protects the shape of this specific walker.

The '358 Johnson Patent is again for a "Combination Wheelchair And Walker". In this case what is shown is the widened arm bars (31) but the are non-rotatable. There is a backrest (44) but it does not function as a leaning bar to push the chair.

The Doyle Patent involves a "Walking Aid" in the simply standard walker by today's standards with a seat and arms to push the person.

The '020 Harroun Patent is similar to the previously discussed Harroun Patent and is best illustrated to show that a user essentially is between the seat and the front bar (45) and can use the wheelchair as a walker to basically push the chair forward.

The Wohlgemuth Patent discloses a walker and the bar (80) in the back is designed for a person to push someone seated within the chair. From its positioning relative to the seat, it is unlikely that it could function as a device where a user can lean his shoulder against it and use it as walker.

The Woleen Patent discloses a “Convertible Chair and Walker Assembly” which has the ability to be converted from a chair to a walker.

The Hara Patent discloses a “Rolling Walker”, which can be used as a seat and pushed the other way as a walking chair.

The Melgarejo Published Patent Application discloses a wheelchair with a backrest and handgrips which enable the chair to be pushed. The chair can also be folded up for transportation.

The Hallgrimsson Patent is a “Combination Walker and Transport Chair”. It discloses a seat for a person to sit on and horizontal hand rails to facilitate pushing the person.

The Miyoshi Published Patent Application discloses a “Wheelchair Useable as a Walking Stick”, wherein the wheelchair can be compressed together so that the grip (5) can be used as a walking stick.

The Lauren Patent is a “Combined Wheelchair, Walker, and Sitting Chair”. The handle elements (180-190) are pivotal between a used position shown in FIG. 1, having a second top brace element (116) located between the distal end (194) of the second handle element (190) and the proximal end (192) of the second handle element (190) and a stored position, shown in FIG. 2. However, in use the handle element is horizontally oriented.

The European Patent Application is for the “Rolling Walker” and is an application which is the same as the previously discussed Hara Patent.

The Miyoshi European Patent is again the same as the previously discussed Miyoshi Patent and is able to convert the wheelchair into a walking stick.

The Grotner PCT Application is a “Combination Wheelchair and Walker”, which is configured so that it can be pushed by a person whereas in FIG. 14 it is converted so that the person can sit in the chair and be pushed.

The Bohn Published Patent Application is a “Rolling Walker with Arm Rest Platforms”, which shows fairly wide arm platforms (22) but they are not padded and they are not rotatable. The chair can be used as a walker but again only by gripping the vertical arms (28) and pushing the chair and with no ability to push with the shoulder.

In general, the prior art inventions are substantially the same because they are primarily crutches with poorly designed seats and only a single bar for a seat back.

There is a significant need for an improved apparatus which enables a person with back problems or other physical disabilities to walk from one location to another and to comfortably sit in a chair in spite of physical problems such as back pain.

SUMMARY OF THE INVENTION

The present invention relates generally to a combination walker and wheelchair which is sometimes referred to in the text as a walking chair, which enables a person with back problems and other physical disabilities to walk from one location to another without assistance from a third person and also enables the person to comfortably sit in the chair in spite of the person’s back pains. The ergonomically friendly design of the present invention includes a high level transverse bar which enables the invention to be pushed by a person’s chest or enables the person to lean against the invention; a foldable main structural frame; a detachable back support and seat; and rotatable wide armrests made with compressive materials. Therefore, the present invention can be used as a walker, a wheel chair, a transportation chair, a golf club trolley, and a spectator chair.

It has been discovered, according to the present invention, that if the present invention combination walker and chair includes a main frame having a support structure with a right and left fold assembly which can be folded, then the present invention can be folded up when not in use to enable it to be easily stored, shipped, and carried.

It is also been discovered, according to the present invention, that if the combination walker and chair includes a leaning bar which is positionable at the level of a user’s chest, and if the leaning bar is supported by right and left rotatable shoulder arms which are respectively locked to the right and left support sections of the main frame of the invention, then if the rear wheels of the present invention are in the locked position, a person can comfortably lean against the back of the leaning bar to enjoy a rest while standing at the same time. Also, if the rear wheels are in the unlocked condition, then the person can use the invention as a walker by pushing against the leaning bar with the person’s chest as the person walks form one location to another.

It has further discovered, according to the present invention, that if the invention includes a multiplicity of ski-pole type gripping members or Nordic walking pole type griping members positioned at an elevated location on the back of the chair, then the chair can also serve as a walker which can be adjusted to the person’s height and hand grip to facilitate the person walking from one location to another.

It has additionally been discovered, according to the present invention, that if the chair portion comprises a removable seat and a removable backrest, then the chair can be more easily disassembled and then reassembled.

It has further been discovered, according to the present invention, that if the chair portion includes wide armrests which are made with compressive materials, then the wide armrests facilitate more comfortable seating in the chair, especially for a larger person who has back pain problems.

It has also been discovered, according to the present invention, that if the wide armrests are rotatable from their in use horizontal position to a vertical orientation, then the present invention can be more easily passed through a door opening or more narrow hallway for transportation of the chair assembly from one location to another.

It has additionally been discovered, according to the present invention, that if the chair assembly includes a pair of front and shoulder glides respectively positioned on the outer portion of the left and right side of the chair assembly, and chair assembly can be more easily folded up to provide a uniform smooth sliding surface to slide the chair assembly into a vehicle or into a cargo area of an airplane or over a floor.

It has also been discovered, according to the present invention, that if the height of the front and rear wheels of the chair assembly are adjustable, then the overall height and cant of the chair can be adjusted to accommodate the individual person when that person is seated in the chair assembly. One way to adjust the height is to insert a multiplicity of washers or spacers on the chair below the seat supports.

It has further been discovered, according to the present invention, that if the chair assembly includes upper brakes and lower brakes, then the movement of the chair assembly can be carefully and efficiently controlled by braking different portions of the chair assembly as needed. The purpose of the lower brake sis to enable the person to cause the chair to stop while the person is seated in the chair. The upper brakes serve a dual function. They can brake the chair in ordinary horizontal movement and in the event the chair is rolling down a hill or downward grade on a street, the brakes can be pre-pumped to act like ABS brakes to prevent the chair from rapidly rolling down a hill.

It is therefore a primary object of the present invention to provide a combination assembly which includes the features of hiking sticks, a walker, a wheelchair and a seating lawn chair and also functions as a transportation chair and golf club trolley.

It is also a key object of the present invention to provide a chair assembly for people who have a bad back and can't sit on a hard surface such as a typical restaurant chair, sports stadium seat, or even padded theater seats so that the person can comfortably sit for extended periods of time without suffering back pain. In addition, rugged construction of the chair assembly enables it to be used at a park, golf course or other outdoor location in addition to use at home or in another indoor facility such as a restaurant.

It is also an object of the present invention to provide a walker and wheelchair assembly which is easily transportable and can be rolled through a standard 30 inch door.

It is an additional object of the present invention to provide a walker and wheelchair assembly which includes wide compressible armrests to facilitate the user's comfort when seated and which armrests are rotatable so that they can be rotated to a vertical orientation to facilitate moving the assembly through a tight space. The wide compressible armrests provide up to five (5) inches of additional width to the chair so that the user's arms can rest comfortably. The armrests are constructed of foam and fabric and are attached to the arm supports in a manner which enables them to be turned in or compressed to enable the assembly to be passed through a doorway, into the back of a car, or through other tight spots.

It is another object of the present invention to provide a walker and wheel chair assembly which can be disassembled into two or three pieces so that the entire chair can be slipped into the back seat of a family car and removed and reassembled just as easily.

It is another key object of the present invention to provide a movable chair assembly which is comfortable for big and tall people as well as normal sized people by providing an assembly where handle height and seat cant are both adjustable.

In general, walkers and rollators are basically crutches which are designed to provide a lot of stability for a person over a short distance but are very uncomfortable and ergonomically unsuited to be used to walk great distances. It has further been discovered, according to the present invention, that if the assembly includes arms and grips like trekking poles, then the user can grab on and hold the assembly in a variety of different ways to be used as a walker. The design facilitates walking on uneven terrain as well as flat surfaces. In addition the nordic walking or trekking pole grips, the shoulder rest (leaning bar), chair rails and stabilizing bars enable a user to change hand positions frequently if the person's shoulders, upper back and hands become uncomfortable in one position.

It is additionally an object of the present invention to provide the assembly with a leaning bar which fits between the handles and is positioned to be at the chest height of a user. With this accessory, the walker and wheelchair assembly also functions as a standing desk or bar. The person can lean on the bar while standing which is very comfortable and also relieves lower back pain. With the rear wheels positioned in a vertical orientation relative to the leaning bar, the user can also rest one foot on a wheel while leaning against the leaning bar which is generally recognized as a preferred ergonomic position. The leaning bar and handles are positioned even with the back of the rear wheels as opposed to other walkers where the center of gravity is more forward—providing more crutch-support but less mobility. However, the chair still provides plenty of support when leaning on the leaning bar because in doing so the user is actually pushing forward slightly against locked wheels thereby shifting the center of gravity when leaning to a portion of the chair which is firm and stable. In is therefore another discovery that because the user is pushing forward slightly even when leaning heavily, the chair moves forward easily, thus promoting prolonged walking over all types of terrain. Pushing straight down, as with traditional walkers and rollators, tends to force a stop after each step thus interrupting and discouraging a regular stride and tiring, upper back pain, and arm fatigue from prolonged use.

It is another object of the present invention to provide upper brake handles to be used when the assembly is being pushed while the user is standing behind it and also lower brake assemblies to enable a person seated in the assembly to stop the movement of the chair.

Existing rollators are all pushed from the front and have only a single position for the handholds which is ergonomic only if the user is centered between the handles with the arms more or less straight down. None boast multiple hand positions or have a bar to lean on with upper arms while standing. This is similar to trekking poles that also allow the user to change positions. It is also similar to racing bicycles that may have handlebars with a tri-bar accessory or detachable and adjustable vertical handles. Because of the above advantages as discussed in the discoveries and objects of the present invention, the present invention walker and wheelchair can be pushed from the back while the user is walking and is therefore much easier to roll thereby facilitating ease of walking. Multiple hand holds allow the user to change among a variety of ergonomic positions as the walk progresses. In addition, the rear wheel can be used to rest one's foot off the ground while resting and this is a significant ergonomic improvement. The handle height and the angle of the handle are adjustable.

It is an additional object of the present invention to provide an extra-long space between the handles and the first cross-member, thereby providing extra room for the leg to swing forward and take a comfortable stride without hitting shins or feet. It is also an object of the present invention to provide even more room because the arms are in a natural bent position gripping a vertical handle in front of the user as opposed to walkers and rollators where one is leaning on arms that are more or less straight down during part of the stride.

It is another object of the present invention to provide a glide on the back or sides of the assembly to allow easy sliding for stowage on its back in addition to easy disassembly into two or three pieces for easy stowage and reassembly.

It is also an object of the present invention to provide a walker and wheelchair assembly which can also function as a golf bag to hold golf clubs and also function as a trolley for transportation on a golf course.

It is a further object of the present invention to provide a rollable and portable walker and wheelchair assembly to accommodate a large person such as a football player, basketball player, sumo wrestler, weightlifter and other large people.

It is another object of the present invention to provide a spectator chair because many public events require considerable walking from the parking lot to the viewing area. It is a further advantage of the present invention to enable non-wheeled chairs to nest in the present invention so that a number of chairs can be carried to a location at one time. The assembly also has additional space to carry food and supplies.

It is also an object of the present invention to provide a wheelchair with comfortable footrests so that a second person can push the chair while a person is seated in it. The multiple handholds also will make pushing easier relative to normal wheelchair handles.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 9, there is illustrated present invention walking chair 1, which is user friendly and of ergonomic design which contains a foldable main structural frame, detachable back support and seat, leaning bar, and rotatable wide armrests made with compressive materials, and can be used for various applications including but not limited to a walker, a wheel chair, a transporting golf club trolley, and a spectator chair.

Figure 1:
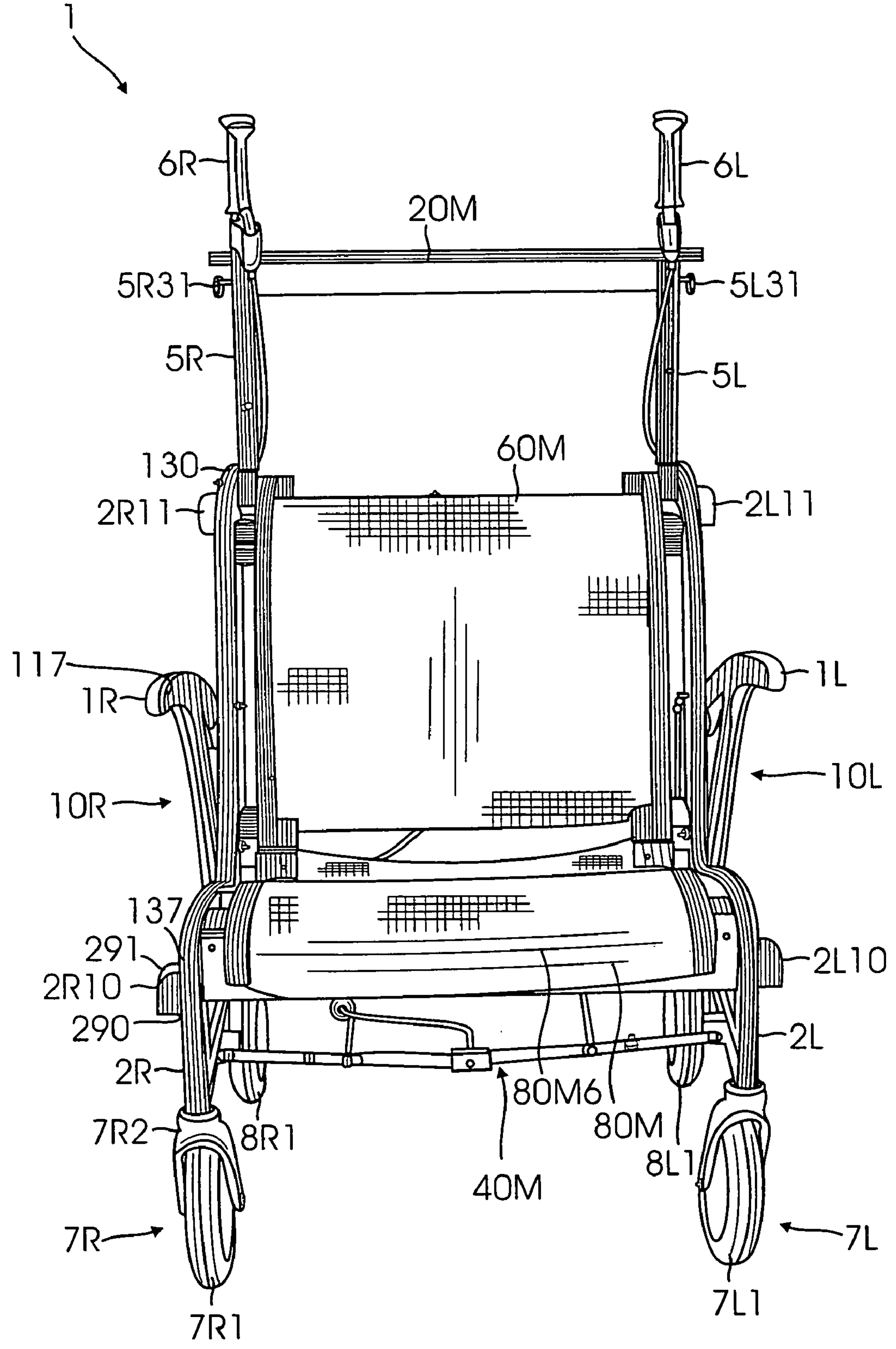
FIG. 1 is a front view of the present invention walking chair, wherein two foldable shoulder arms of the walking chair are at their elevated positions.
Figure 4:
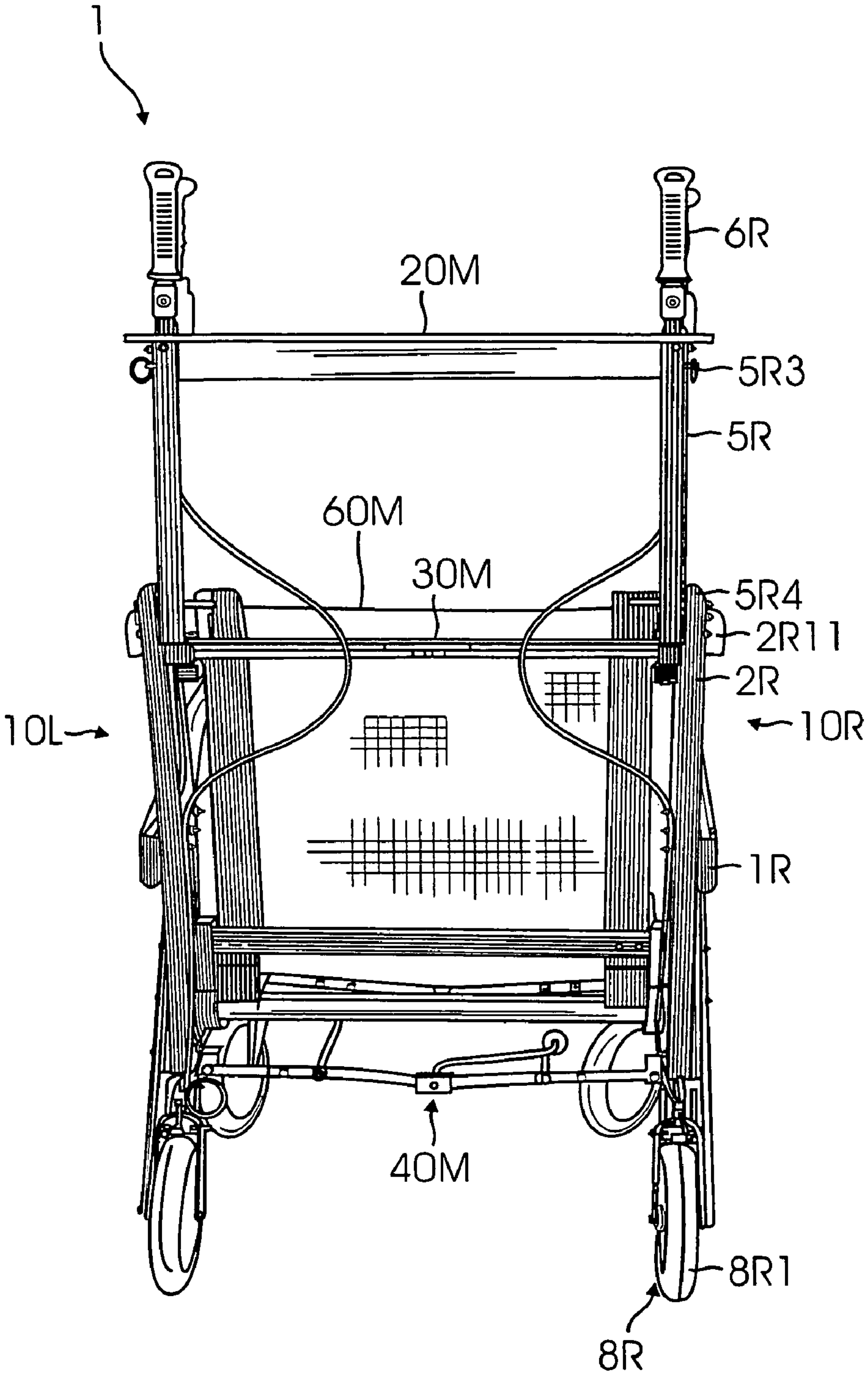
FIG. 4 is a rear elevational view of the present invention walking chair, wherein two foldable shoulder arms of the walking chair are at their elevated position.

Referring to FIGS. 1 and 4 there is illustrated the present invention walk chair 1, comprising a supportive structure including a right side support 10R, a left side support 10L, and structural members between the right and left side support including a leaning bar 20M, a fold assembly 40M, a high bar 30M, a back support 60M, and a seat 80M, wherein the right side support 10R is a mirror image of the left side support 10L.

Figure 3A:
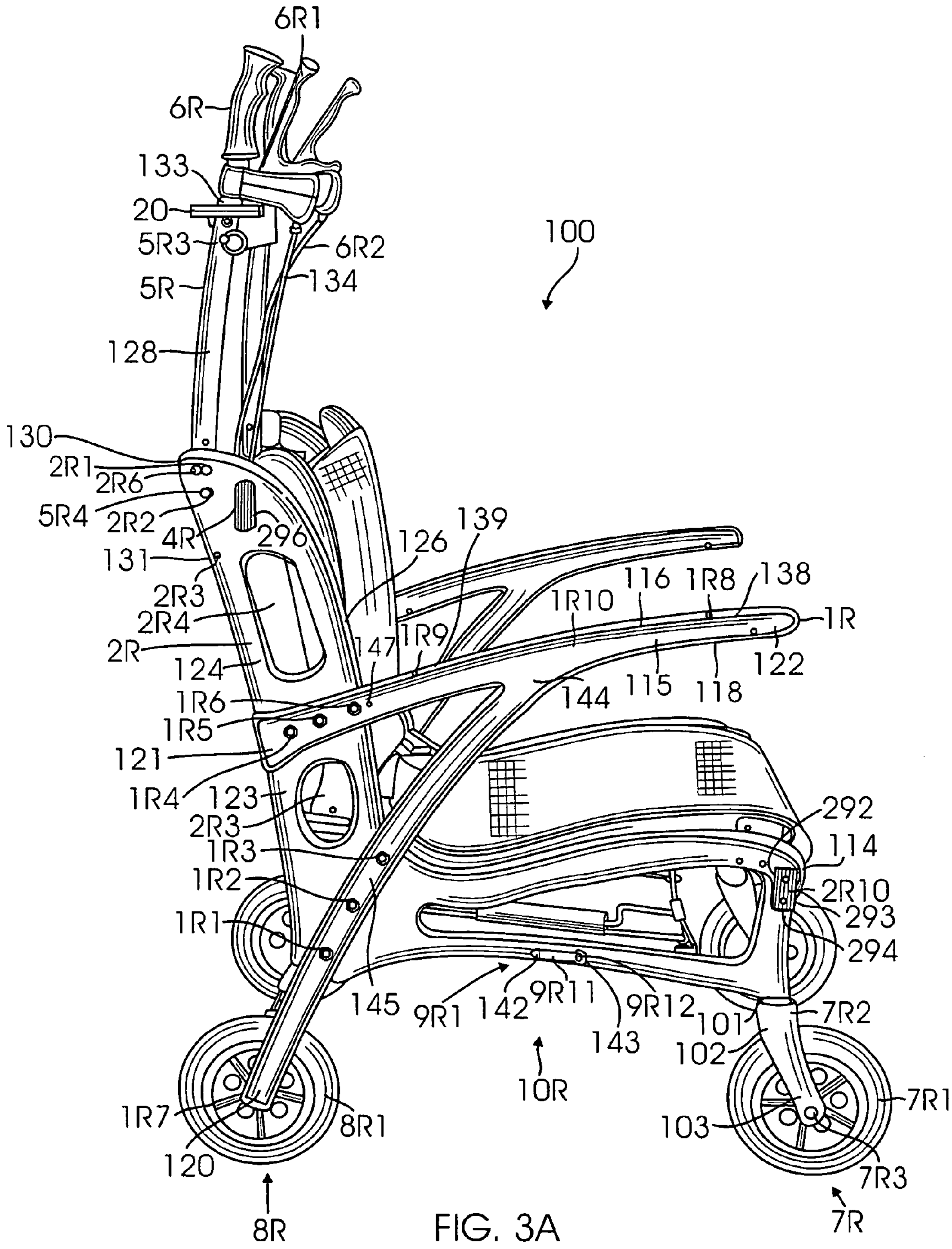
FIG. 3A is a right side perspective view of the present invention walking, wherein two foldable shoulder arms of the walking chair are at their elevated positions.

Referring to FIGS. 1 and 3A there is illustrated the detailed structural components of the right support 10R of the present invention walking chair 1, wherein a right side foldable elongated shoulder arm 5R is at its elevated position.

Figure 7:
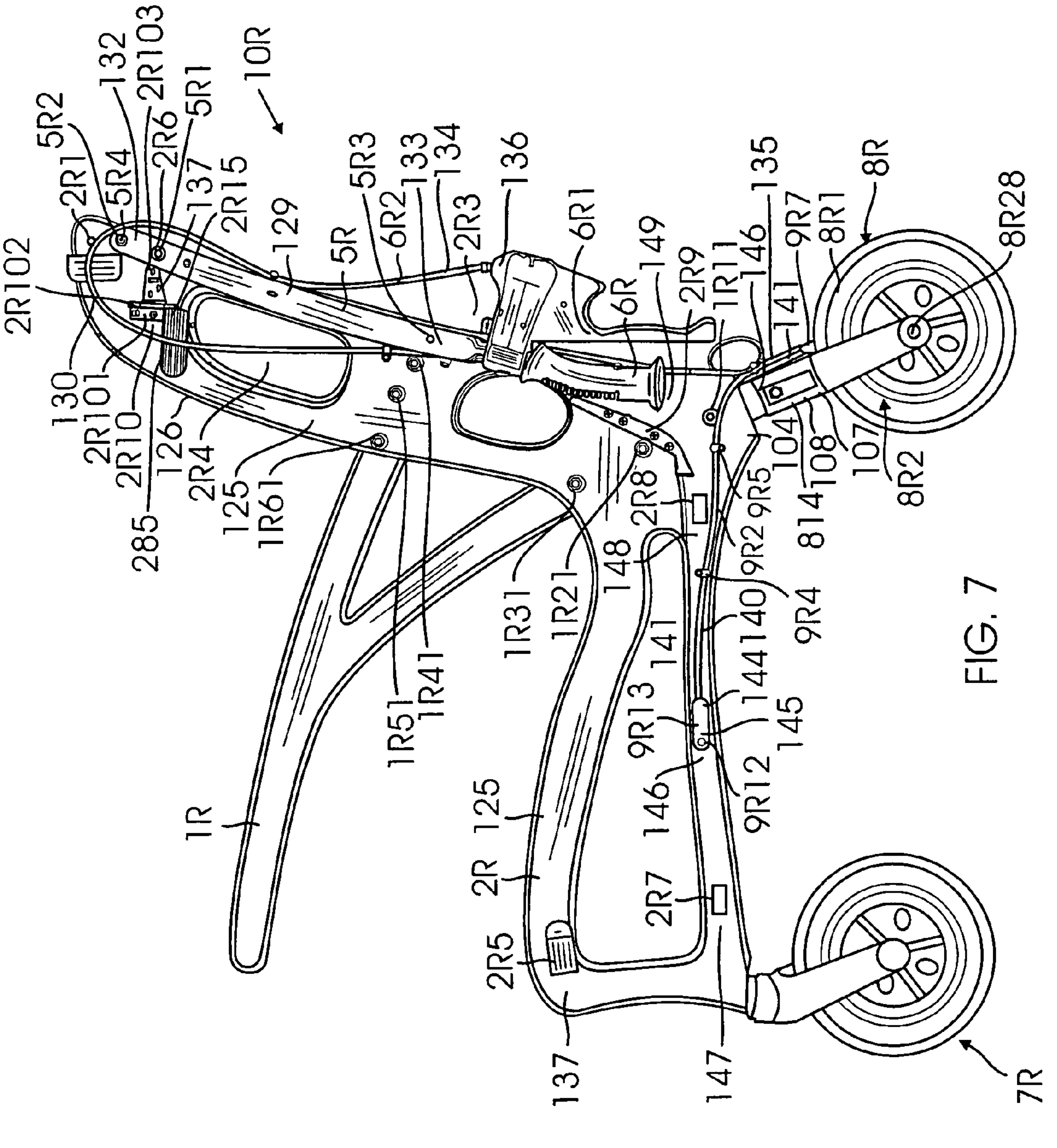
FIG. 7 is a side view of the right side support structure of the present invention walking chair illustrating the inner side structure wherein the foldable arm is in the folded position.

As illustrated in FIG. 3A, the right side support 10R which is shown from a perspective view comprises three main structural components including a "y" shaped part 1R, an "L" shaped part 2R, and a right shoulder arm 5R. The "L" shaped part 2R is further shown attached to a two-wheel assembly system comprising a right front wheel assembly 7R and a right rear wheel assembly 8R. These three main structural components are also illustrated in FIG. 7 from an inner side view for a complementary description of the right support 10R. Referring to FIGS. 1 and 3A, there is illustrated the "y" shaped part 1R, the "L" shaped part 2R, and the elongated shoulder arm 5R being planar and having an appropriate thickness in order to enable them to have sufficient mechanical strength for their applications.

As illustrated in FIG. 3A, the two-wheel assembly system is attached to the bottom of the "L" shaped part 2R. A right front wheel assembly 7R comprises a wheel 7R1, and a wheel support 7R2. The wheel support 7R2 is an inverted "U" shaped structure as further illustrated in FIG. 1, wherein two symmetric bottom open ends 103 of the support 7R2 are permanently fixed with an axis 7R3 wherein the axis penetrates through a rotational center of the wheel 7R1. Therefore the wheel 7R1 is smoothly rotatable such as a conventional rotatable caster, wherein the wheel rotational plane is perpendicular to the ground. Further referring to FIG. 3A, there is illustrated the upper end 102 of the wheel support 7R2 connects to a front bottom corner 101 of the "L" shaped part 2R. It will be appreciated that the connection for the wheel support 7R2 to the front bottom corner 101 is through a mechanical mechanism wherein the wheel support 7R2 is smoothly rotatable around a symmetric axis of its inverted "U" shaped structure. With said mechanical mechanism, the right front wheel 7R1 is rotatable in any direction on the ground. Also illustrated in FIG. 3A is the right rear wheel assembly 8R which is connected to the "L" shaped part 2R. However, as discussed below, the rear wheel is only rotatable in one direction. The front wheels can rotate 360 degrees. By way of example only, the wheels can be eight (8) inches in diameter and one and one-half (1½) inches wide.

Figure 7A:
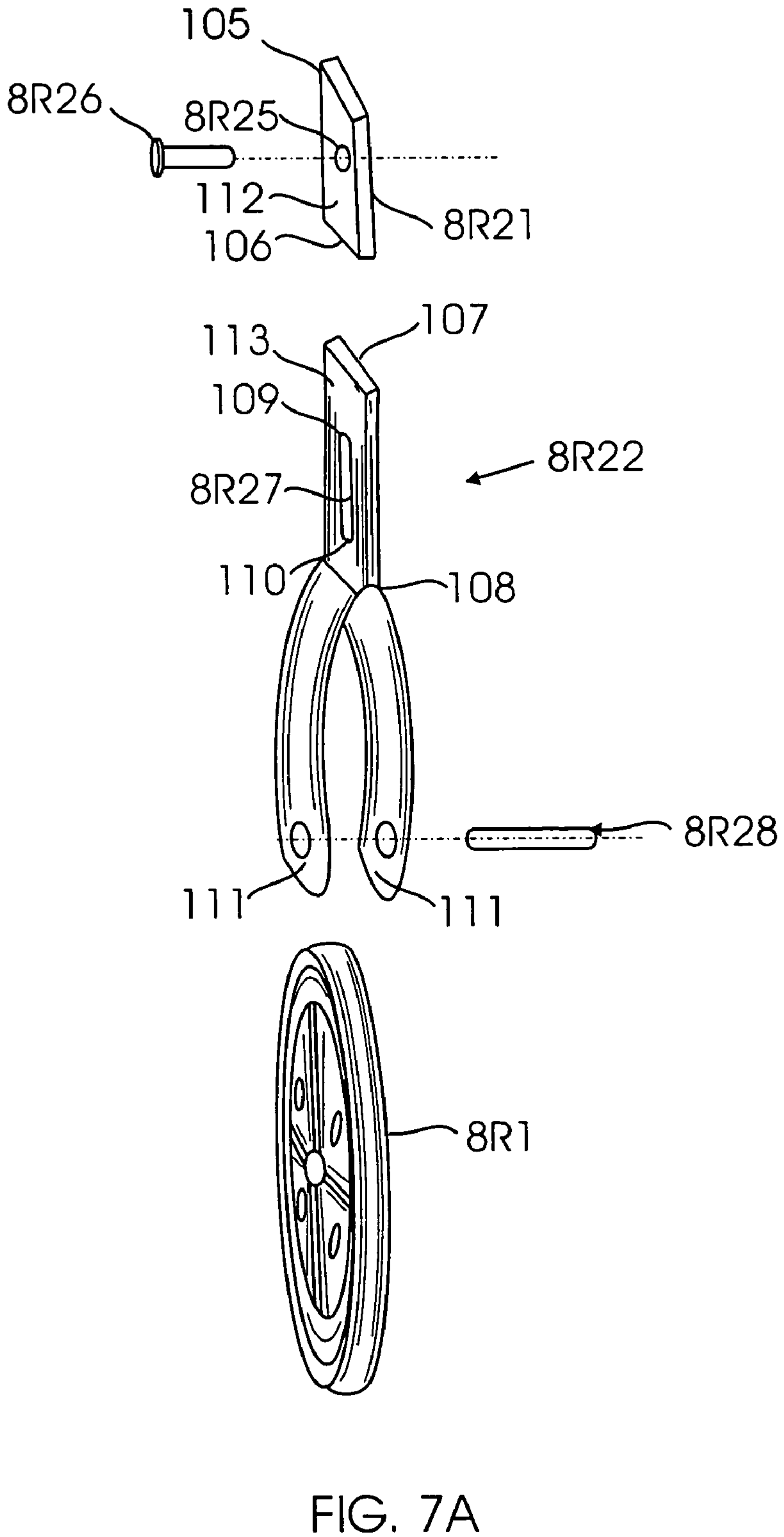
FIG. 7A is an enlarged exploded perspective view a rear wheel support of the rear wheel assembly shown in FIG. 7.

Referring to FIG. 7, there is illustrated the right rear wheel assembly 8R comprising a wheel 8R1 and wheel support 8R2 connected to a rear bottom corner 104 of the "L" shaped part 2R. Referring to FIG. 7A, the right rear wheel support 8R2 is composed to two parts: a first part 8R21 which is an elongated cuboid with an upper end 105, a bottom end 106, and an elongated rectangular left side 112, wherein a thread hole 8R25 on the vertical left side 112 penetrates a center of the planar bar to receive a screw 8R26; and a second part 8R22 which has the detailed features illustrated in FIG. 7A. For the second part 8R22, a hollow bar connects an inverted "U" shaped structure. The hollow bar is a hollow cuboid comprising an elongated rectangular left side 113 with a top end 107 and a bottom end 108. The inverted "U" shaped structure has an inverted "U" shaped longitudinal cross section with one top end and two identical bottom ends 111. The hollow bar at the bottom end 108 longitudinally connects to the top end of the inverted "U" shaped structure, so that a center plane of the hollow bar which is parallel to the left side plane 113 is aligned to a symmetric plane of the inverted "U" shaped structure and is perpendicular to the inverted "U" shaped cross section. Said the elongated planar bar 8R21 matches the elongated hollow cuboid of the second part 8R22, wherein the bar 8R21 is slidably inserted along its longitudinal direction into the hollow cuboid of the second part 8R22 by inserting second end 106 into the elongated cuboid until the first end 105 of the bar 8R21 is adjacent top end 107. Further, referring to FIG. 7A, there is illustrated an elongated slot 8R27 having an upper end 109 and a bottom end 110 located along a longitudinal central line on the left side 113 of the hollow cuboid of the second part 8R22, wherein the position of the slot 8R27 matches the hole 8R25 of the first bar 8R21. Thus the screw 8R26 is able to lock the elongated bar 8R21 at various heights between the upper end 109 and the bottom end 110 of the slot 8R27 by tightening the screw, which results in a variation of height of the upper end 105 of the elongated planar bar 8R21 relative to the second part 8R22 of the wheel support 8R2. Referring to FIGS. 7 and 7A, there is illustrated the elongated planar bar 8R21 connected to the second part 8R22, wherein the screw 8R26 is positioned at an appropriate location in the elongated slot 8R27 on the hollow structure of second part 8R22. As illustrated, the upper end 105 of the first part 8R21 of the wheel support 8R2 is connected to the right rear bottom corner 104 of the right side "L" shaped part 2R. Therefore, an adjustment in the height of the upper end 105 varies the height of the rear bottom end 104 of the "L" shaped part 2R of the right side support 10R. Therefore, the right rear wheel support 8R2 is able to adjust the level of the seat 80M of the present invention walking chair 1 to adjust to the body height of the user, which is one of the ergonomic advantages of the present invention. As further illustrated in FIG. 7A, a wheel 8R1 is connected to the bottom end 111 of the inverted "U" shaped structure of the second part 8R22 of the wheel support 8R2 through an axle 8R28. In this configuration, the wheel 8R1 is able to rotate only in the forward and back direction which is parallel to the plane of the right side support 10R.

It is also possible to change the height and cant of the chair by adding washers on the back. By way of example, the washers can be one-eighth inch (⅛) thick.

Referring FIGS. 3A and 7A, there is illustrated the "y"shaped part 1R connected to the "L" shaped part 2R through two groups of screws and nuts. As illustrated in FIG. 3A, the "y" shaped part 1R having a left top end 120, a right top end 121 and a bottom end 122, is positioned onto the "L" shaped part 2R, wherein the slightly convex body of the "y" shaped part 1R, defined by the right top end 121 and the bottom end 122, has an ascending angle relative to the ground. The "y" shaped part 1R is placed in this orientation, specifically wherein the left top end 120 of the part 1R extends to be above the position of the wheel axle 8R28 of the wheel 8R1, and the right top end 121 is attached onto a middle point 123 of the back of a vertical member of the "L" shaped part 2R. It is understood that, the "y" shaped part 1R can be alternatively placed at different ascending angles to achieve a desired user friendly and ergonomic condition. Referring to FIGS. 3A and 7, there is illustrated two groups of screws and nuts used to connect the "y" shaped part 1R and the "L" shaped part 2R. The first group of three screws 1R1, 1R2, and 1R3 shown in series in FIG. 3A is located around a middle point 145 of a side branch of the "y" shaped part 1R, wherein the middle point 145 is defined as the generally ventral location between the left top end 120 and a middle point 144 of the convex body of the part 1R. The first group of three screws locks the "y" shaped part 1R and the "L" shaped part 2R together through respective nuts 1R11, 1R21, and 1R31 screwed onto each of the three screws, as shown in FIG. 7. Similarly, a second group of three screws, 1R4, 1R5, and 1R6 in series as illustrated in FIG. 3A are located on the "y" shaped part 1R starting adjacent to the right top end 121 and ending at a position 147 where a front 126 of the vertical member of the "L" shaped part 2R contacts the convex body of the "y" shaped part 1R. Further, the three screws and their respective nuts 1R41, 1R51 and 1R61 as illustrated in FIG. 7 lock the parts 1R and 2R together.

Referring to FIGS. 3A and 7, there is illustrated a connection mechanism between the right side "L" shaped part 2R, and a right side elongated shoulder arm 5R which is illustrated in the elevated position. As shown in FIG. 3A, three holes 2R1, 2R2, and 2R3 in series perpendicularly penetrate through the right side 124 of the "L" shaped part 2R along a left edge 131 of the vertical member from a top position 130 of the "L" shaped part. Two holes 2R1 and 2R3 have the same diameter and the diameters are smaller than the diameter of the hole 2R2. As shown in FIG. 7, the right side elongated shoulder arm 5R has two holes 5R2 and 5R1 in series which perpendicularly penetrate through it on a central line of the left side 129 of the elongated shoulder arm 5R starting from the first end 132 on the arm, wherein the hole 5R1 is smaller than the hole 5R2. The holes of 2R1, 2R3, and 5R1 are all the same size, the holes 2R2 and 5R2 are the same size, and a distance from the hole 2R2 to 2R1 is the same as that from the hole 2R2 to that 2R3, which is also the same distance from the hole 5R1 to 5R2. Carrying such structural parameters, the present invention is able to use an axle 5R4 shown in FIGS. 3A and 7 to join the right side elongated shoulder arm 5R to the right side "L" shaped part 2R, wherein the left side 125 of the "L" shaped part faces the right side 128 of the elongated right side shoulder arm 5R. Therefore, the shoulder arm 5R is rotatable around the rotational axle 5R4, wherein said shoulder arm 5R starting at a folded position shown in FIG. 7 can be rotated counterclockwise to its vertically elevated position shown in FIG. 3A, which results in hole 5R1 being above the hole 5R2, and in line with hole 2R1 of the "L" shaped part 2R. A pin 2R6 is inserted into the hole 2R1 of the "L" shaped part 2R and extends to the hole 5R1 of the elongated arm 5R as shown in FIG. 3A. Thus the elongated arm 5R is locked at its elevated position, which results in a rigid connection for the shoulder arm to the "L" shaped part. The "L" shaped part 2R and elongated shoulder arm 5R are built with sufficient mechanical strength to provide a strong and stabile structure when they are joined together. Similarly, the elongated arm 5R is able to be locked at its folded position after the pin 2R6 is inserted into the hole of 2R3 of the "L" shaped part 2R as extends to the hole 5R1 of the elongated shoulder arm 5R as shown in FIG. 7. The foldable shoulder arm is thereby secured which is one of many features for a user friendly condition of the present invention walking chair 1.

As also illustrated in FIG. 7, four additional support structures are located on the left side 125 of the "L" shaped part 2R, which includes a seat support 2R5 located on an upper front 137 of a horizontal member, a first rotational support 2R7 at a bottom front 147, a second rotational support 2R8 at a bottom middle rear position of 148, and a seat and back support 2R9 at 149 located above a bottom rear corner 104 of the "L" shaped part 2R.

Further referring to FIG. 3A, there is illustrated an upper brake control unit comprised of a brake handle bar 6R connected at the second end 133 of the elongated shoulder arm 5R along the longitudinal direction of the arm. One unique feature of the present invention is that handle bar 6R is designed in the shape of a trekking pole to facilitate walking long distances. The height and angle of the handle bar 6R is also adjustable to facilitate holding it in a multiplicity of desirable ergonomic positions. Said brake handle bar 6R has accessories including an upper brake handle 6R1 and an upper flexible brake cable 6R2 having a first end 134 and a second end 135. As illustrated, the brake handle bar 6R is further able to rotate around the longitudinal direction of the elongated shoulder arm 5R, which is also one of many user friendly features of the present invention walking chair 1.

As shown in FIG. 7, for the upper brake control unit, the upper brake cable 6R2 at the first end 134 links to the bottom position 136 of the upper brake handle 6R1, and at the second end 135 of the cable links to a brake paddle 9R7, wherein a brake unit including the brake paddle is placed into a chamber located immediately under the top of the inverted "U" shaped structure of the rear wheel support 8R2. It is understood that the brake paddle used in the present invention is only one of several types of standard spring brake units which can be used with the present invention. For simplification in disclosure of the present invention, only the most relevant components of the brake paddle are mentioned. It will also be understood that the brake cable used in the present invention is a standard brake cable comprising a steel string residing in a flexible cylindrical hollow spring tube, wherein the spring is connected for 9R7 touches the wheel 8R1 to resist the wheel rotation after the brake paddle is pulled from the upper brake cable 6R2 so that it is stretched when a user presses the upper brake handle 6R1 towards to the handle bar 6R. Reversibly, the brake paddle 9R7 moves away from the wheel 8R1 to free the wheel rotation after the upper brake cable 6R2 is released from the stretched condition when the upper brake handle 6R1 is returned to the normal position.

In addition to having the upper brake control unit, the present invention further comprises a bottom brake control unit to enhance the user friendly condition of the walking chair 1 by allowing the user to brake the chair while the user is in a seated position which is important when the chair is on a slanted surface. It also allows the user to lock the chair in position for added stability when pushing down on the arms to rise from the seat, and to minimize the chance of the chair "running out" from under the user.

Referring to FIGS. 3A and 7, the bottom brake control unit 9R is illustrated and comprises a brake handle assembly 9R1, wherein a first component which is a bottom brake handle 9R11 is shown in FIG. 3A. Also illustrated is a bottom flexible brake cable 9R2 having the first end 140 and the second end 141, two cable fasteners 9R4 and 9R5, and the brake paddle 9R7 which is shared with the upper brake control unit.

Further referring to FIGS. 3A and 7, the bottom brake handle assembly 9R1 comprises a bottom brake handle 9R11 as shown in FIG. 3A having the first end 142 on the left and the second end 143 on the right, a working bar 9R13 shown in FIG. 7 having the first end 144 to the right and the second end 145 to the left, and an axle 9R12

Further referring to FIGS. 3A and 7, the bottom brake handle assembly 9R1 comprises a bottom brake handle 9R11 as shown in FIG. 3A having the first end 142 on the left and the second end 143 on the right, a working bar 9R13 shown in FIG. 7 having the first end 144 to the right and the second end 145 to the left, and an axle 9R12 perpendicularly linking the bottom brake handle 9R11 at the second end 143 and the working bar 9R13 at second end 145 through a hole 9R3 (not shown) on the bottom structure of the "L" shaped part 2R, wherein said hole 9R3 is located at the middle 146 of the bottom of a horizontal member of the "L" shaped part 2R. Therefore, the bottom brake handle assembly 9R1 has a shape similar to the symbol for pi when viewed from the top. Referring to FIG. 7, there is illustrated the mechanical connection of said bottom cable 9R2 to the working bar 9R13 of the bottom brake handle assembly 9R1, wherein the first end 140 of the bottom cable 9R2 links the first end 144 of the working bar 9R13, the bottom cable 9R2 is then attached to the left side 125 of the bottom horizontal member of the "L" shaped part 2R through respective cable fasteners 9R4 and 9R5, and the second end 141 of the bottom cable 9R2 links the brake paddle 9R7. It is understood that the brake paddle 9R7 works in the following way. When the bottom brake control unit is activated, the brake paddle 9R7 touches the wheel 8R1 to resist the wheel rotation when the bottom cable 9R2 is stretched by the user from turning the first end 142 of the bottom brake handle 9R11 around the axle 9R12 180 degrees from left to right, which results in a synchronized half cycle rotation for the first end 144 of the working bar 9R13 from the right to left as shown in FIG. 7. The 180 degree rotation of the first end 144 of the working bar 9R13 around the axle 9R12 from the right to left causes stretching of the bottom cable 9R2 since the first end 140 of the cable 9R2 is linked at the first end 144 of the working bar 9R13, wherein the first end 140 originally resides at the right side relative to the rotational axis 9R12, corresponding to when the cable 9R2 is not stretched which corresponds to a non-working state of the brake paddle 9R7 so that the wheel 8R1 is free to rotate. Reversibly, the brake paddle 9R7 is able to release the wheel 8R1 if the bottom brake handle 9R11 has a half cycle rotation from the right to left around the rotational axle 9R12 to the original position.

Both brake handles operate one brake when inserted into a side location.

The above disclosures illustrate in detail the structure and mechanisms of functionality for the right side support 10R of the present invention walking chair 1, including the “y” and “L” shaped parts, the two-wheel assembly, the elongated shoulder arm, and the upper and bottom brake control units. It is understood that the left side support 10L is a mirror image of the right side support 10R, therefore the left side support 10L comprises the same structure and mechanisms as those of the right side support 10R as well as structural components which also are the mirror images of those of the right side support 10.

Referring to FIGS. 1, 2, 4, 8A, 8B, and 8C, there is illustrated a fold assembly 40M of the present invention walking chair 1, wherein said fold assembly 40 M is a main structure to make the walking chair foldable.

Figure 2:
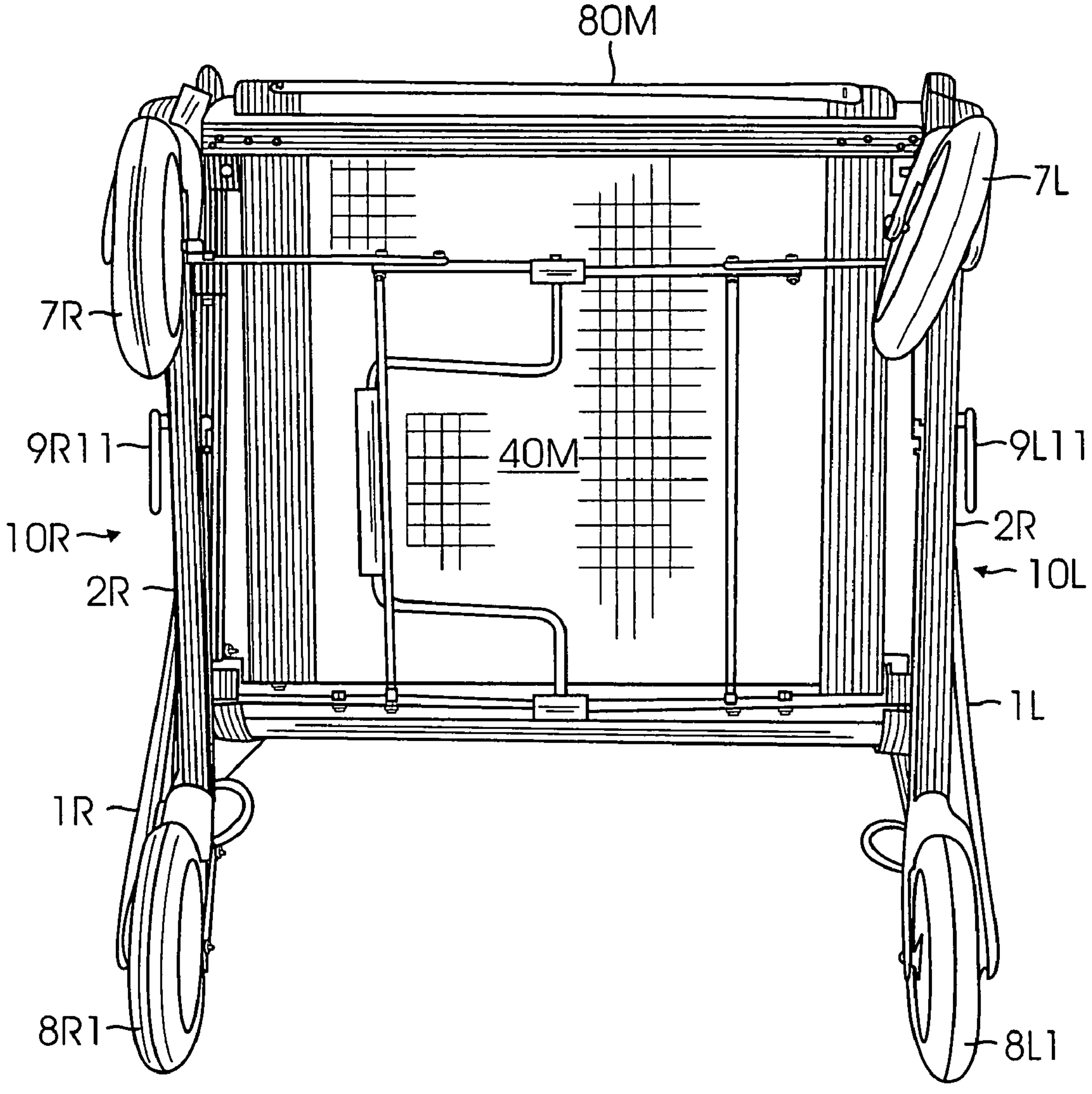
FIG. 2 is a bottom plan view of the present invention walking chair.
Figure 8A:
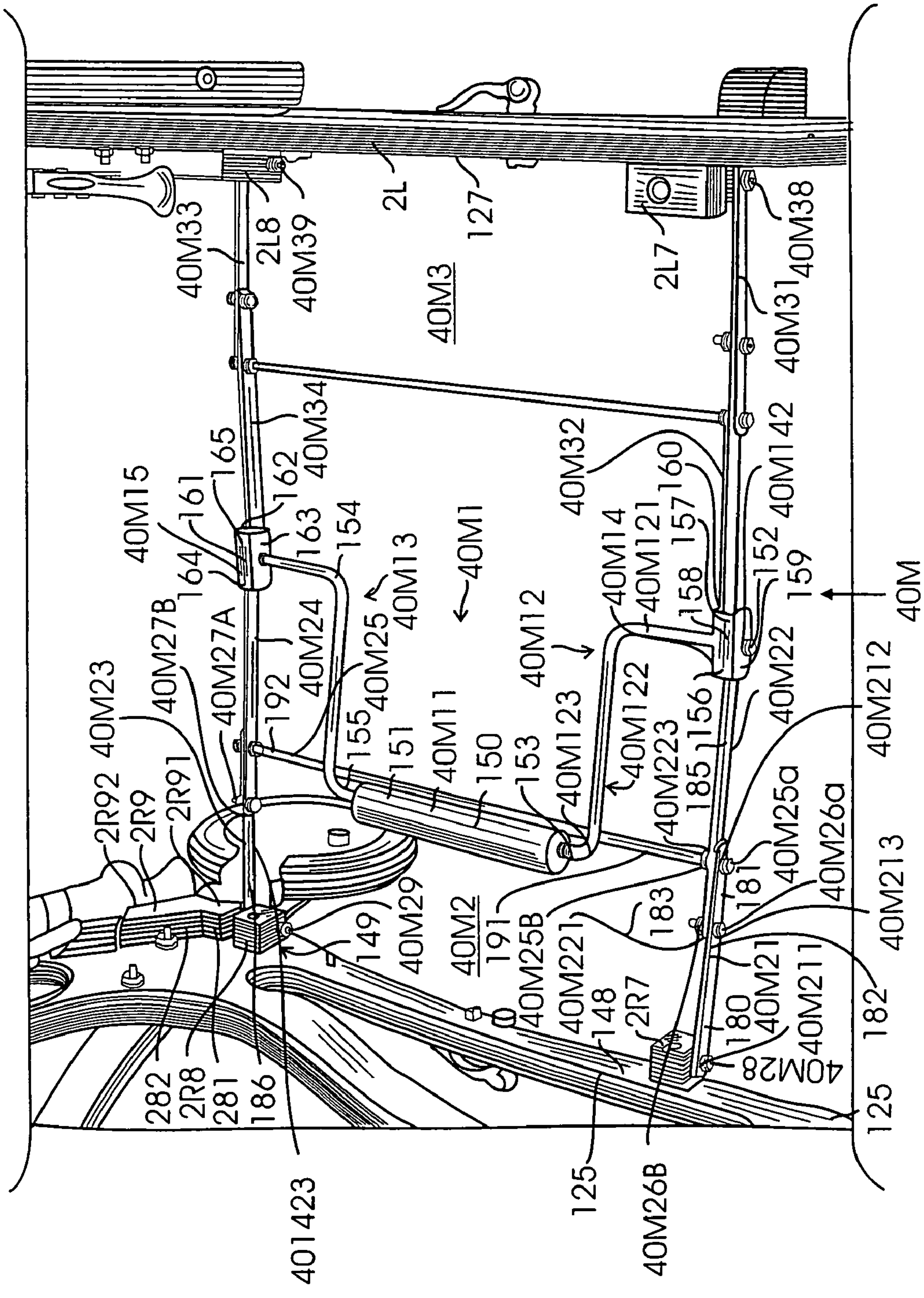
FIG. 8A is a perspective top view of the foldable fold assembly, wherein the fold assembly is in the extended in use condition.
Figure 8B:
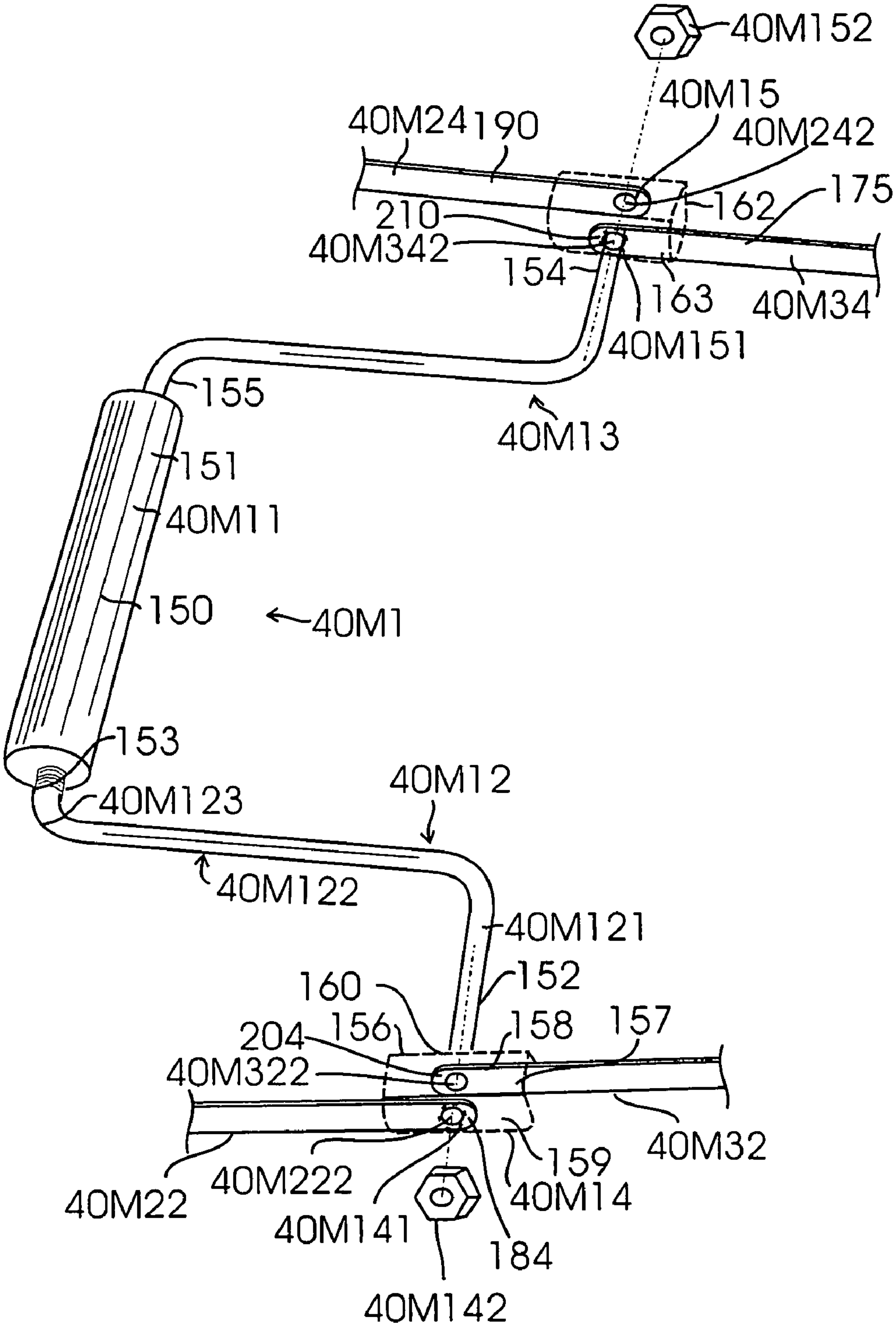
FIG. 8B is an enlarged exploded perspective view to illustrate the connection among a handle unit, a right half of the fold frame, and a left half of the fold frame of the fold assembly shown in FIG. 8A.
Figure 8C:
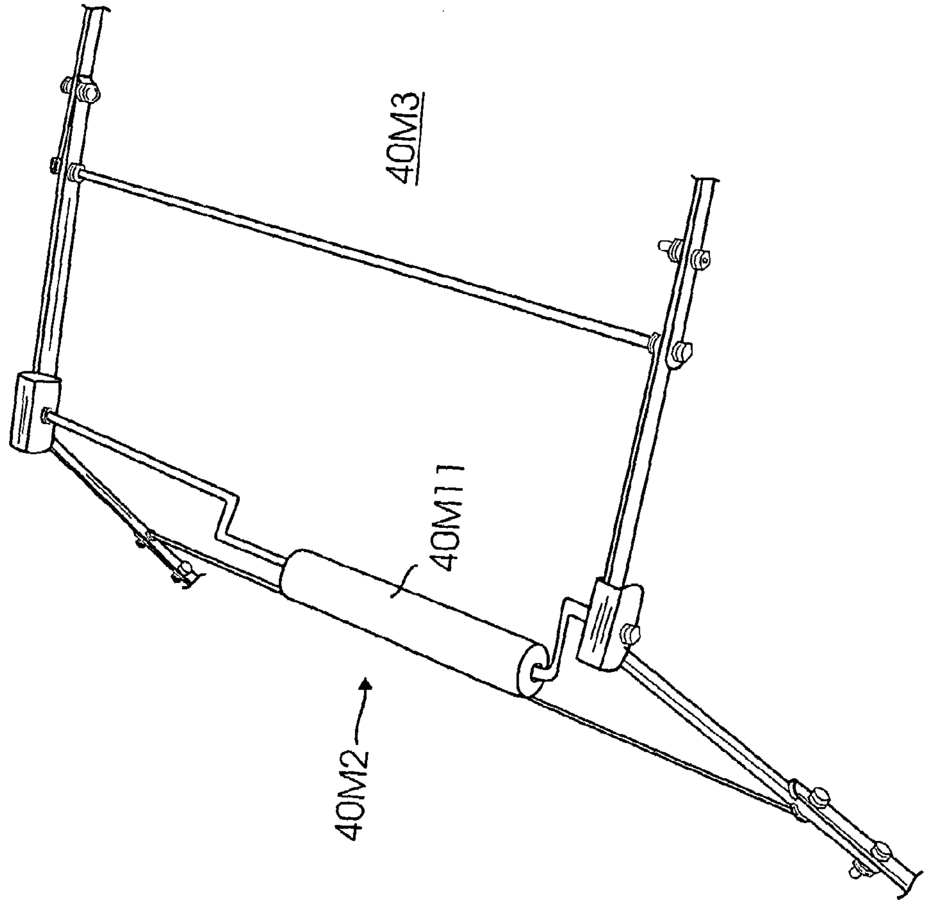
FIG. 8C is a perspective top view of the foldable fold assembly, wherein the fold assembly is in the folded condition.

Referring to FIGS. 1, 2, and 4, there is illustrated the fold assembly 40M from a respective front, bottom, and back view to show the fold assembly 40M placed in the bottom of the chair 1 to rotatably connect the right and left side support 10R and 10L. Referring to FIGS. 8A, 8B, and 8C, there is illustrated detailed the structural composition of the fold assembly 40M, wherein FIG. 8A discloses structural components of the fold assembly 40M at an extended and in use position, FIG. 8B shows in detail connection of two symmetric frame units of the assembly, and FIG. 8C demonstrates the fold assembly at a folded position.

Referring to FIG. 8A, the fold assembly 40M comprises a fold assembly handle unit 40M1, and a frame structure containing two symmetric units, a right frame unit 40M2 and left frame unit 40M3. As illustrated, the fold assembly handle unit 40M1 is comprised of a handle 40M11, a front bent rod 40M12 and a rear bent rod 40M13, a front part 40M14, and a rear part 40M15. The handle 40M11 is an elongated cylinder having a front and rear central thread hole (not shown) along the central rotational axis of the cylinder respectively positioned at the front 150 and rear end 151 of the cylinder. The front bent rod 40M12 has a first threaded end 152 and second threaded end 153 which has three elongated sections located in the same plane including a first section 40M121 having the first threaded end 152 along the elongated direction 90 degrees to the left to connect a middle section 40M122 that follows the elongated direction 90 degrees to the right connecting to a third section 40M123 that ends from the second thread end 153, wherein the second threaded end 153 has threads that match the thread hole located at the first end 150 of the handle 40M11. It is understood that the rear bend rod 40M13 is a mirror image of the front bend rod 40 M12, comprising a first threaded end 154 and a second threaded end 155, wherein the second thread end 155 has threads that match the thread hole at the second end 151 of the handle 40M11. As further illustrated in FIG. 8A, the front part 40M14 is an elongated structure with an inverted squared open bracket section of a “U” with a flat bottom shaped cross section, comprising a right end 156, a left end 157 in the elongated direction, a top elongated rectangular surface 158, a front 159 and rear 160 elongated rectangular surface. A hole 40M141 (not shown) perpendicularly penetrates through a center of the front 159 and rear 160 elongated rectangular surfaces. It is also understood that the rear part 40M15 is a mirror image to the front part 40M14, comprising a top 161, front 162, and rear 163 elongated rectangular surface, a right 164 and left 165 end, and a hole 40M151 (cannot seen) perpendicularly penetrated through the center of the front 162 and the rear 163 elongated rectangular surface.

Referring to FIG. 8A, there is illustration that the fold assembly handle unit 40M1 is assembled, which the handle 40M11 links to the front bent rod 40M12, wherein the second screwed end 153 of the front bent rod 40M12 is screwed into the screw hole at the front end 150 of the handle 40M11, which results in that the elongated direction of the handle 40M11 is perpendicular to the second section 40M122 of the front bent rod 40M12, and the first end 152 of the front bent rod 40M12 perpendicularly penetrates the center hole 40M141 of the rear elongated rectangular surface 160 and continues through the same center hole of the front elongated rectangular surface 159 of the front part 40M14, wherein the top elongated surface 158 is parallel to the surface defined with the first section 40M121 and the second section 40M122 of the front bent rod 40M12. It is understood after a similar assembly, the rear brent rod 40M13 connects the handle 40M1, wherein the second screwed end 155 is screwed into the screw hole at the rear end 151 of the handle 40M11, and the first threaded end 154 of the rear bent rod 40M13 perpendicularly penetrates through a center hole 40M151 of the rear elongated rectangular surface 163 and continues through the same center hole of the front elongated rectangular surface 162 of the rear part 40M15, wherein the top elongated surface 161 of the rear part 40M15 is parallel to the plane defined with the first section 40M121 and the second section 40M122 of the front bent rod 40M12. It is further understood that after such assembly, the handle 40M11, the front bent rod 40M12, and the rear bent rod 40M13 are in the same plane.

Further referring to FIG. 8A, there is illustrated the right frame unit 40M2 of the fold assembly 40M, which is comprised of four strip bars comprising a front right strip bar 40M21 partially joined a front right middle strip bar 40M22 with a first set of screw 40M26A and nut 40M26B, and their mirror image parts, a rear right strip bar 40M23 partially joined a rear right middle strip bar 40M24 with a second set of screw 40M27A and nut 40M27B. One elongated rod 40M25 perpendicularly respectively joins front and rear strip bars with its front thread end 191 and rear thread end 192 of the rod, wherein the right frame unit 40M2 is rotationally joined the right side “L” shaped part 2R through two rotational supports 2R7 and 2R8 located on the left side 125 of the 2R. As illustrated, the front right strip bar 40M21 is an elongated rectangular planar strip with an appropriate thickness, having a first hole 40M211 at a right end 180, a second hole 40M212 at a left end 181, and the third hole 40M213 at a second left end 182. Similarly, the front middle right strip bar 40M22 comprises a first hole 40M221, second hole 40M222 shown in FIG. 8B, and third hole 40M223 respectively at a right end 183, a left end 184 shown in FIG. 8B, and the second right end 185. As further illustrated, the front right strip bar 40M21 partially joins the front middle right strip bar 40M22, when the front right strip bar 40M21 is placed onto the front middle right strip bar 40M22, wherein the third hole 40M213 of the bar 40M21 matches the first hole 40M221 of the bar 40M22 where they are rigidly joined with the first set of the screw 40M26A and the nut 40M26B, and second hole 40M212 of the bar 40M21 matches third hole 40M223 of the bar 40M22, when they are rigidly joined wherein a first nut 40M25A is placed in the front side of the front right strip bar 40M21 and the second nut 40M25B is placed in the rear side of the front middle right strip bar 40M22 wherein the front thread end 191 of the elongated rod 40M25 penetrates the second nut 40M25B, the third hole 40M223 of the front middle right strip bar 40M22, the second hole 40M213 of the front right strip bar 40M21, and the first nut 40M25A in series. As further illustrated in FIG. 8A, the front right side strip bar 40M21 rotationally joins to the “L” shaped part 2R of the right side support 10R through a pin connection wherein a pin 40M28 acting as a front right side rotational axle penetrates the first hole 40M211 at the right end 180 of the front right strip bar 40M21 and continues through a horizontal hole of the rotational support 2R7 wherein the rotational support 2R7 is a cubic structure permanently fixed to the left side 125 of the "L" shaped part at the front bottom position 148. It is understood that a structure of the rear right strip bar 40M23 partially joined a rear right middle strip bar 40M24 with a second set of screw 40M27A and nut 40M27B, and is the mirror image of the structure of the front right strip bar 40M21 partially joined to a front right middle strip bar 40M22 with a first set of screw 40M26A and nut 40M26B. Therefore a detailed description for the rear set is omitted. As further illustrated in FIG. 8A, the rear right side strip bar 40M23 rotationally joins to the "L" shaped part 2R of the right side support 10R through a pin connection wherein a pin 40M29 acting as a rear right side rotational axle penetrates the first hole 40M231 (not shown) at the right end 186 of the rear right strip bar 40M23 and continues through a horizontal hole of the rotational support 2R8 wherein the rotational support 2R8 is a cubic structure permanently fixed to the left side 125 of the "L" shaped part 2R at the rear bottom position 149. It is then understood that the right frame unit 40M2 comprising the front set of the strip bars and the rear set of the strip bars linked by the elongated rod is able to rotate towards the left side 125 of the right side support 10R if and upward force is applied to the unit. The left frame unit 40M3 is the mirror image of the right frame 40M2. Therefore, a description of the structure and assembly illustrated for the left frame unit 40M3 in FIG. 8A is omitted.

Referring to FIG. 8C, there is illustrated the connection of the right 40M2 and left 40M3 frame units of the fold assembly 40M. As illustrated in FIG. 8C, the front right middle strip bar 40M22 is placed into the inside room defined by the cross section of the inverted open bracket shaped structure of the front part 40M14, wherein the left end 184 having the hole 40M222 of the bar 40M22 is inserted into inside the room defined under the top surface 158, and between the front surface 159 and rear 160 surface of the front part 40M14 following a direction from the right end 156 to the left 157 end of the part 40M14, when the left end 184 is placed into a section of the inside room close to the front surface 159, wherein the hole 40M222 is aligned to the center hole 40 M141 of the front part 40M14. Similarly the front left middle strip bar 40M32, a mirror image of the front right middle strip bar 40M22, is also inserted into a section close to the rear surface 160 of the inside room, wherein the hole 40M322 at the right end 204 of the strip bar 40M32 is also aligned to the center hole 40M141. The first threaded end 152 of the front bent rod 40M12 penetrates in series through the center hole 40M141 of the rear surface 160 of the front part 40M14, through the hole 40M322 of the front left middle strip bar 40M32, the hole 40M222 of the front right middle strip bar 40M22 and the center hole 40M141 of the front surface 159 of the front part 40M14, wherein the front thread end 152 is secured by a nut 40M142. Similarly the first thread end 154 of the rear bent rod 40M13, a mirror image of the front bent rod 40M12, penetrates thought the center hole 40M151 of the rear surface 163 of the rear part 40M15, a hole 40M342 at the right end 210 of the rear left middle strip bar 40M34, a hole 40M242 at the left end 190 of the rear right strip bar 40M24, and the center hole 40M151 of the front surface 162 of the rear part 40M15, wherein the first threaded end 154 is secured by a nut 40M152. All of the mentioned holes have an appropriate tolerance to the size of the thread end. Therefore, a smooth rotation is achieved for both of the first threaded ends 152 and 154.

Referring to FIG. 8C in reference FIG. 8B, there is illustrated an operation of the fold assembly 40M wherein the handle 40M11 is pulled upward to an elevated position, which upward pulling force makes the fold assembly folded wherein the right frame 40M2 rotates relative to a rotational axis defined by the front right rotational pin 40M28 inside of the front rotational support 2R7 and rear right rotational pin 40M29 inside of the rear rotational support 2R8 wherein both rotational supports are located on the left side 125 of the "L" shaped part 2R of the right side support 10R, and located above and to the left side of the right side support 10R. The left frame 40M3 rotates, relative to the front left rotational pin 40M38 inside of the front left side rotational support 2L7 and the rear left rotational pin 40M39 inside rear left side rotational support 2L8 wherein both rotational supports are located on the right side 127 of the left side "L" shaped part 2L of the left support 10L, above and to the right side 127 of the left support 10L. Thus a combination of the upward and rightward rotation of the right frame 40M2 and upward and leftward rotation to the left frame 40M3 makes the right support 10R and left support 10 L move close together which thereby enables the chair 1 to be folded.

Figure 11A:
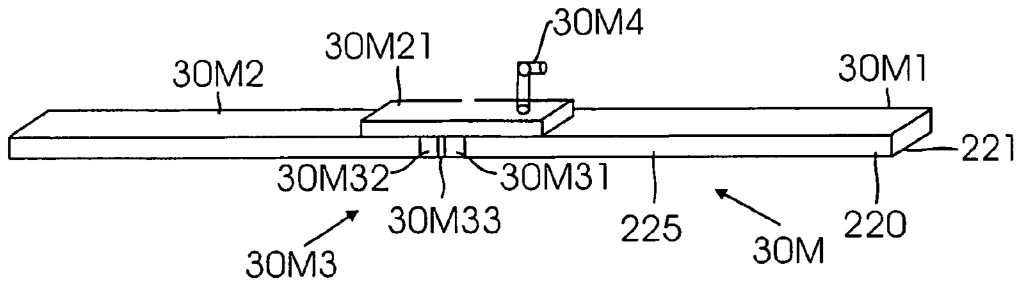
FIG. 11A is a perspective view to show the structure of a foldable high bar, wherein the high bar is unfolded.
Figure 11B:
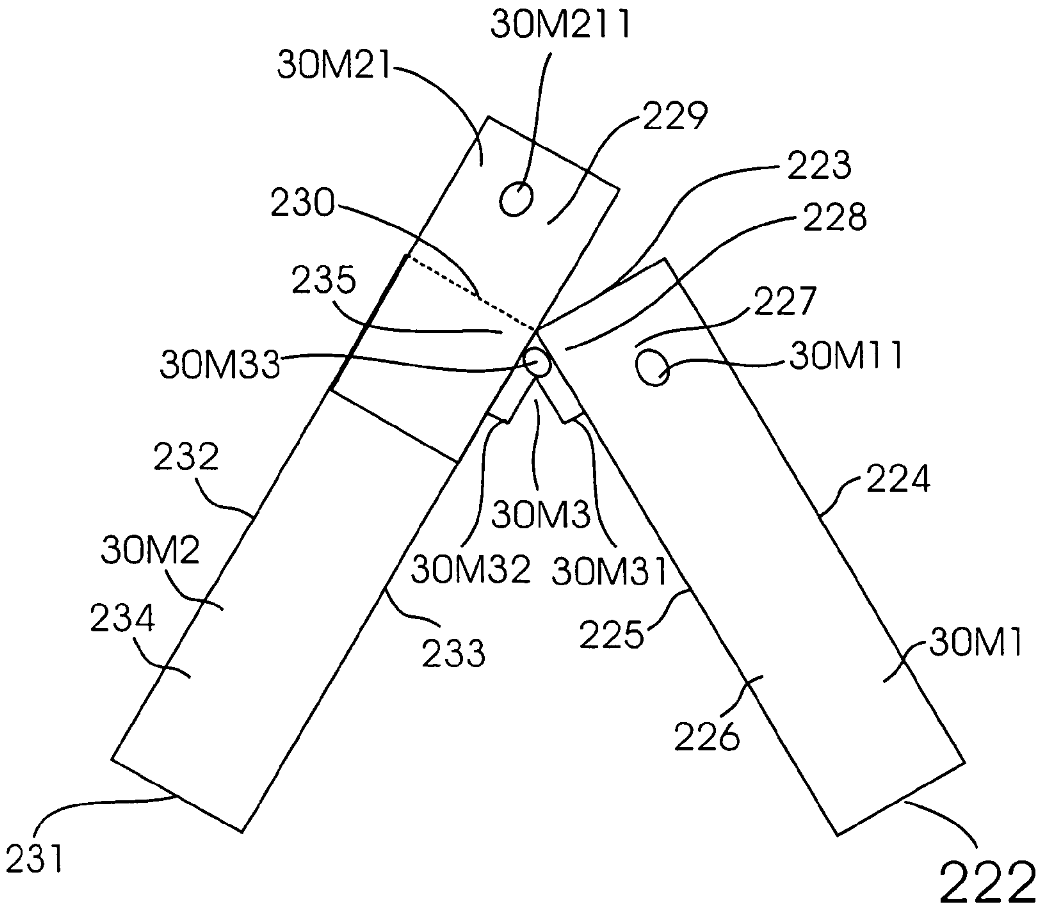
FIG. 11B is a top view to show the mechanism to fold the high bar, wherein the high bar is folded.

Referring to FIG. 4, there is illustrated a high bar 30M located at an upper position between the right chair 10R and left support 10L. Further referring to FIGS. 11A and 11B, there is respectively illustrated the high bar 30M from a perspective view in an unfolded condition, and a top view of the high bar 30M in a folded condition. As illustrated in FIG. 11A, the high bar 30M is generally an elongated rectangular shaped bar having a rectangular cross section including a depth 220 and a width 221. As illustrated in the top view of FIG. 11B, the high bar 30M is further composed to two components, a right part 30M1 and a left part 30M2. The parts are joined by a middle hinge 30M3. The right part 30M1 comprises a right end surface 222, a left end surface 223, a front surface 224, a rear surface 225, and a top surface 226, wherein a hole 30M11 extends perpendicularly through the part including the top surface 226 at a location 227 close to the left rear corner 228. The left part 30M2 comprises a right end surface 230, a left end surface 231, a front surface 232, a rear surface 233, and a top surface 234, wherein a short elongated bar 30M21 having the same rectangular shape as that of the left part is permanently fixed on the top surface 234 of the left part 30M2. Referring to FIG. 11B, the short bar 30M21 is illustrated attached to the left part 30M2 wherein a center surface dividing the elongated short bar is aligned to the right end surface 230 of the left part 30M2, and a vertical hole 30M211 penetrates through the center 229 of the right half of the short bar 30M21. As illustrated in FIG. 11B, further referring to FIG. 11A, the middle hinge 30M3 links the right part 30M1 and the left part 30M2 wherein a right half 30M31 of the hinge is vertically affixed to the right part 30M1 on the rear surface 225 close to the corner 228 of the right part, and a left half 30M32 of the hinge is vertically affixed to the left part 30M2 on the rear surface 233 close to the corner 235 of the left part. Therefore the high bar 30M is able to fold around a rotational axis 30M33 of the hinge 30M3. As illustrated in FIG. 11A, further referring to FIG. 11B, it can be seen that the vertical hole 30M211 on the right half of the short bar 30M21 is aligned the hole 30M11 of the right part 30M1, wherein both holes 30M211 and 30M11 have the same size. Therefore the right part 30M1 is able to lock to the left part 30M2 wherein a pin 30M4 is inserted into the hole 30M211 of the short bar 30M21 of the left part 30M2 and continues through the hole 30M11 of the right part 30M1, which corresponds to the unfolded position of the high bar 30M shown in FIG. 11A. The above discloses a foldable function of the high bar 30M. The following section is going to illustrate how the high bar respectively links to the right and left side supports 10R and 10L.

Referring to FIG. 7, there is illustrated a right hinge 2R10 located at a position close to but below the top 130 on the left side of the "L" shaped part 2R of the right support 10R, comprising a left half 2R101 fixed to the "L" shaped part 2R, a rotational axle 2R102 of the right hinge 2R10 wherein the rotational axle is placed perpendicular to the ground, and a right half 2R103, wherein it is able to rotate from the right position to the left position around the rotational axle 2R102. Referring again to FIG. 7 and further referring to FIG. 11A, it can be seen that the high bar 30M is able to connect the "L" shaped part 2R of the right side support 10R, wherein a front side 137 of the walk half 2R103 of the right hinge 2R10 and the right end surface 222 of the walk part 30M1 of the high bar 30M are screwed together, wherein the top surface 226 of the right part 30M1 is placed parallel to the ground. Similarly, the high bar 30M is also able to link the left side support 10L wherein the left end surface 231 of the left part 30M2 of the high bar and a front surface of a left half of a left hinge 2L10 (not shown) which is a mirror image of the right hinge 2R10 are screwed together, wherein the top surface 234 of the left part 30M2 is placed parallel to the ground. Therefore, the foldable high bar 30M is able to be folded forward horizontally as shown in FIG. 11B when the fold assembly 40M is pulled upward, which results in the fold assembly being folded vertically. The above disclosures illustrate foldability, one of novel features of the present invention walking chair 1.

Referring to FIG. 1, there is illustrated a leaning bar 20M placed horizontally between the right elongated shoulder arm 5Rand the left elongated shoulder arm 5L. Further referring to FIG. 10, there is illustrated th structure of the leaning bar 20M. The leaning bar 20M is composed of two elongated rectangular plates with a rectangular cross section, wherein a bottom plate 20M1 is vertically connected along its elongated side to a bottom side of a top horizontal plate 20M2 at the central line of the plate along its longitudinal direction. The top plate 20M2 is wider than the bottom plate 20M1. The bottom plate 20M1 has a right end with a vertical right end surface 165, wherein a horizontal hole 20M11 penetrates into the center of the right end surface 165 by a small distance, and a left end with a vertical left end surface 166, wherein a horizontal hole 20M12 penetrates into the center of the left end surface 166 by a small distance. The top plate 20M2 has a right end 167 and a left end 168, a front side 169, and a rear side 170. A right open rectangular cavity 20M21 is located close to the right end 167 and opens toward the front 169. A left open rectangular cavity 20M22 is located close to the left end 168 and also opens toward the front 169.

Figure 10:
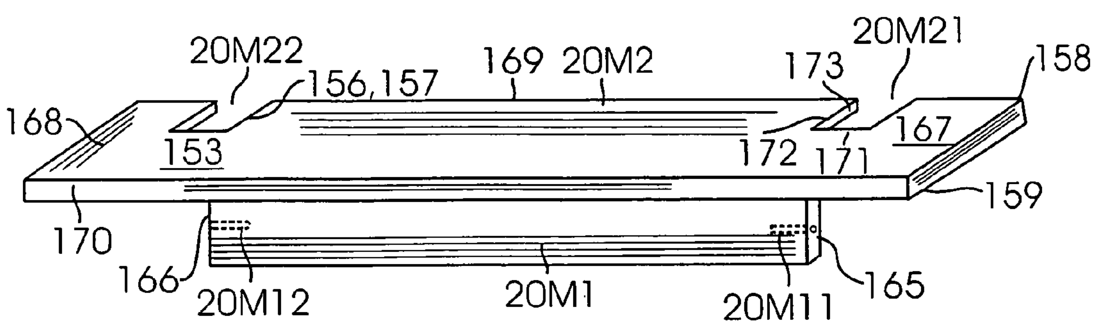
FIG. 10 is a perspective view to show the structure of a detachable leaning bar.

As further illustrated in FIGS. 10 and 1, the right open rectangular cavity 20M21 comprises a width 171, and a length 172 with a vertical lengthwise section surface 173, wherein the lengthwise section surface 173 is aligned with the right end surface 165 of the bottom plate 20M1. The width 171 of the open rectangular cavity 20M11 matches a width of the right shoulder arm 5R having a generally rectangular shaped cross section, and the length 172 is designed to fit the right arm 5R at a position close to the second end 133 of the arm so that it is able to be vertically placed into the cavity wherein a hole 5R3 that perpendicularly penetrates from the elongated right side 128 to the left side 129 of the arm 5R matches the hole 20M11 located on the center of the right end surface 165 of the bottom part 20M1. Therefore, a right side pin 5R31 can be inserted into the hole 5R3 from a direction of the right side 128 to the left side 129 of the right arm 5R and continues into the hole 20M11 located on the right end of the bottom part 20M1 of the leaning bar 20M. Since left shoulder arm 5L and the left end of the leaning bar 20M are mirror images of their right side counterparts, it will be appreciated that a left side pin 5L31 is inserted into a hole 5L3 (not shown) of the left arm 5L and continues into the hole 20M12 located on the left end surface 166 of the bottom part 20M1 of the leaning bar 20M. Referring to FIG. 1, the leaning bar 20M serves as a support for a user to lean onto so that the user is able to have a comfortable rest when the rear wheels 8R1 and 8L1 are locked by respective brake paddles and the right shoulder arm 5R and left shoulder arm 5L are at their elevated positions and are respectively locked to the right "L" shaped part 2R of the right side support 10R and left "L" shaped part 2L of the left side support 10L so that the leaning bar 20M is firmly affixed between the right arm 5R and left arm 5L. If the rear wheels 8R1 and 8L1 are unlocked, then the user can push the walking chair by pushing the user's chest against the leaning bar 20M or pushing against the leaning bar with the user's hands or forearms.

Figure 12:
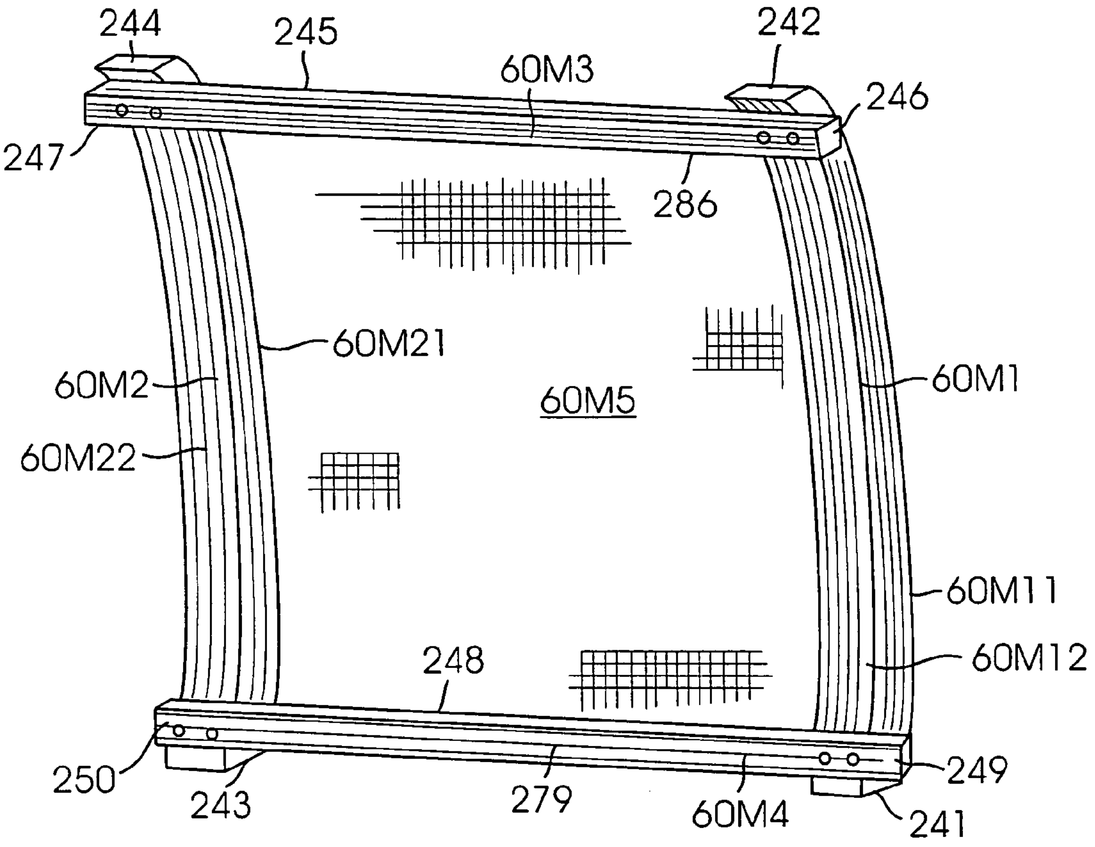
FIG. 12 is a perspective rear view to illustrate the structure of a back support of the present invention walking chair.

Referring to FIG. 1, there is illustrated a back support 60M and seat 80M of the present invention walking chair 1. Further referring to FIG. 12, a detailed structure of the back support 60M is illustrated. The back support 60M is a frame structure covered with a surface material 60M5, comprising a right vertical rod 60M1, a left vertical rod 60M2, a top horizontal bar 60M3, and a bottom horizontal bar 60M4. The right vertical rod 60M1 including a convex front side 60M11 and a concave rear side 60M12, with a bottom end surface 241 and a top end 242. The left vertical rod 60M2 is a mirror image of the right vertical rod 60M1, including a front side 60M21 and a rear side 60M22, with a bottom end surface 243 and a top end 244. The top horizontal bar 60M3 is an elongated cubic bar including a right end 246, a left end 247, a front side 245 and a bottom side 286. The bottom horizontal bar 60M4 is also an elongated cubic bar, including a front side 248, a right end 249, a left end 250 and a rear side 279. The top bar 60M3 horizontally connects the right vertical rod 60M1, wherein respectively the front surface 245 near the right side 246 contacts the rear surface 60M12 at a position just below the top 242. Similarly, the top bar 60M3 horizontally connects the left vertical rod 60M2, wherein respectively the front surface 245 near the left side 247 contacts the rear surface 60M22 at a position just below the top 244. As illustrated in FIG. 12, the bottom elongated horizontal cubic bar 60M4, connects the right vertical bar 60M1, wherein respectively the front surface 248 near the right side 249 contacts the rear surface 60M12 at a position just above the bottom defined with the bottom surface 241. Similarly, the bottom elongated horizontal cubic bar 60M4 connects the left vertical bar 60M2, wherein respectively the front surface 248 near the left end 250 contacts the rear surface 60M22 at a position just above the bottom defined with bottom surface 243.

Figure 13:
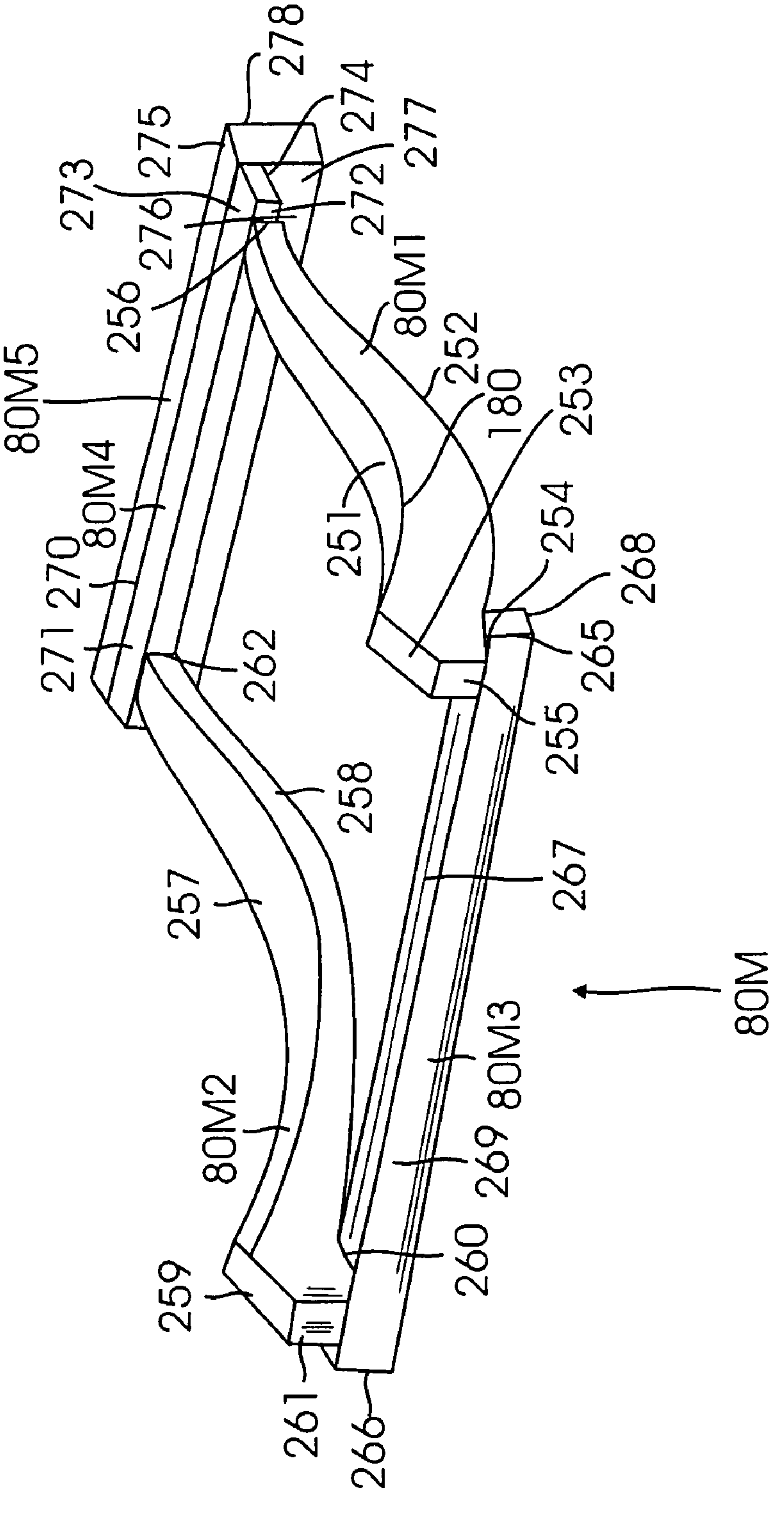
FIG. 13 is a perspective view to illustrated the structure of a seat of the present invention present invention walking chair.

Referring to FIG. 13, there is illustrated the detailed frame structure of the seat 80M without the seat covering materials 80M6 shown in FIG. 1. The frame structure of the seat 80M, comprises a right curved rod 80M1, a left curved rod 80M2, a rear horizontal bar 80M3, a front vertical bar 80M5, and a front horizontal bar 80M4. The right horizontal rod 80M1 comprises a curved top side 251, a curved bottom side 252, a rear upper side 253, a rear bottom side 254, a rear end 255, and a front end 256. The left horizontal rod 80M2 is a mirror image of the right horizontal rod 80M1, comprising a curved top side 257, a curved bottom side 258, a rear upper side 259, a rear bottom side 260, a rear end 261, and a front end 262.

The rear horizontal bar 80M3 is an elongated cuboid with a rectangular cross section having a right end 265, a left end 266, a top side 267, a bottom side 268, and a rear side 269. The front horizontal bar 80M4 and vertical bar 80M5 are elongated cuboids with the same rectangular cross section. The front horizontal bar 80M4 comprises a front side 270, a top side 271, a rear side 272, a bottom side 274, and a right end 273. The front vertical bar 80M5 comprises a front side 278, a top side 275, a rear side 276 and a right end 277. Referring to FIG. 13, the front horizontal bar 80M4 connects the front vertical bar 80M5, wherein the elongated top surface 271 of the front horizontal bar 80M4 is aligned with elongated top surface 275 of the front vertical bar 80M5, and their respective right end 273 and 277 are also aligned. With this configuration, the top side 271 of the front horizontal bar 80M4 is perpendicular to the front side 278 of the front vertical bar 80M5, which creates a 90 degree angle at the connection of the respective bottom side 274 of the front horizontal bar 80M4 and rear side 276 of the front vertical bar 80M5. As that further illustrated in FIG. 13, the right curved rod 80M1 connects the rear horizontal bar 80M3, wherein the curved rod 80M1 is placed 90 degrees to the rear horizontal bar 80M3, and the rear bottom side 254 of the curved rod is placed on the top surface 267 close to the right end 265. The right curved rod 80M1 connects to the front horizontal bar 80M4, wherein the respective front end 256 which is at 90 degrees connects the rear side 272 close to the right end of 273 of the front horizontal bar. It will be appreciated that the connection for the left curved rod 80M2 to the left end of the rear horizontal bar 80M3, and the front horizontal 80M4 and front vertical bar 80M5 corresponds to the same connects as the right curved rod 80M1.

Figure 5:
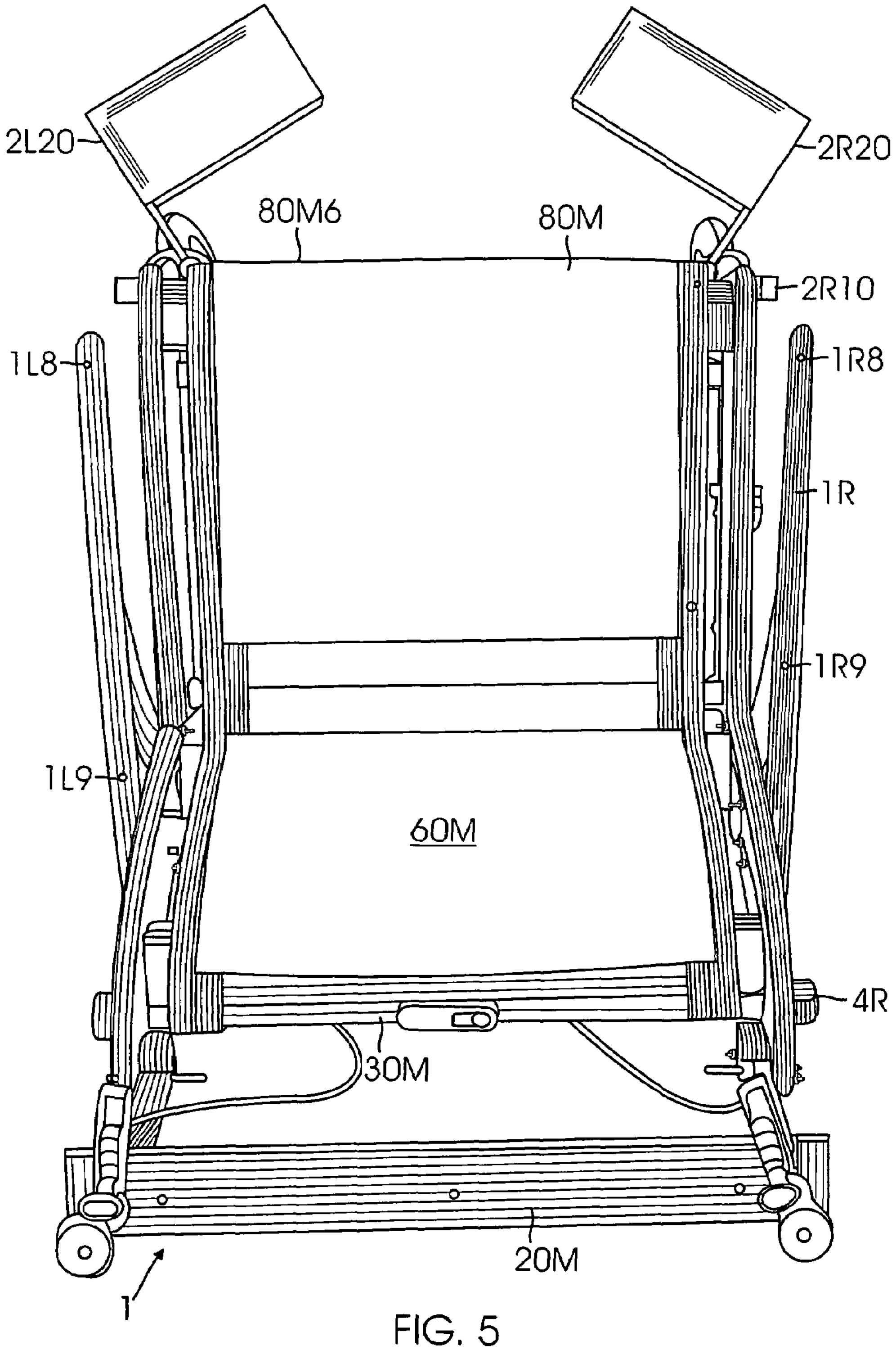
FIG. 5 is a top plan view of the present invention walking chair, wherein two foldable shoulder arms of the walking chair are at their elevated positions.
Figure 6:
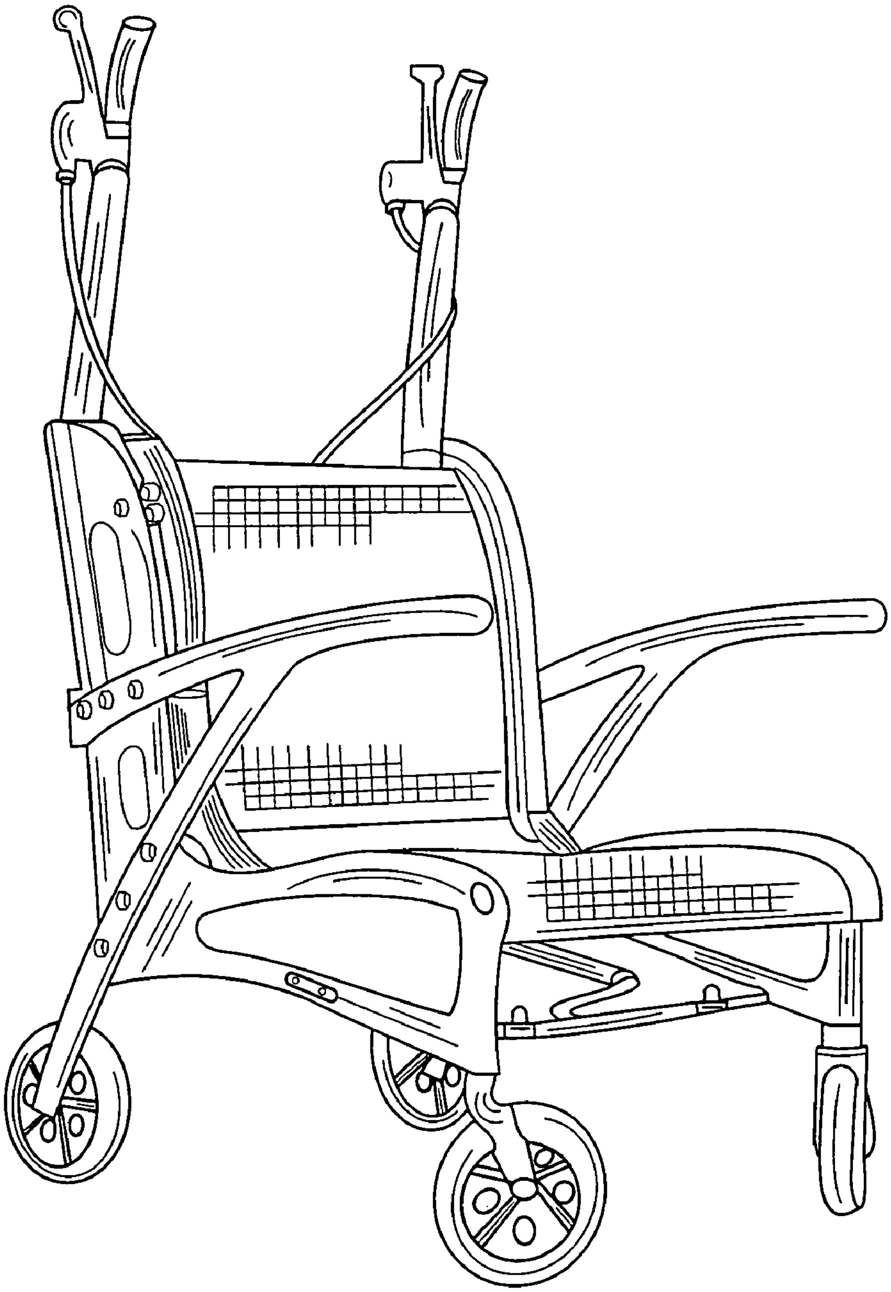
FIG. 6 is a perspective view of the present invention walking chair, wherein two foldable shoulder arms are at their elevated positions and a leaning bar is not attached.

Referring to FIGS. 5, 7, and 8A, there is illustrated the attachment of the seat 80M and back support 60M to the right side support 10R and the left side support 10L, wherein the right side support and the left side support are linked to the fold assembly 40M and to the high bar 20M at their extended positions. As shown in FIG. 7, a front support 2R5 is located at the top front 137 of the left side 125 of the "L" shaped part 2R, and the bottom support 2R9 is located at a position 149 between the first nut 1R11 and the second nut 1R21, along the line defined by the first nut 1R11, the second nut 1R21, and a third nut 1R31. The bottom support 2R9 as shown in FIG. 8A is a bar having a short horizontal section 2R91 with a top surface 281 and a relatively long ascending section 2R92 with front surface 282. A top support 2R15 shown in FIG. 7 is horizontally located above the top of the hole 2R4, close to front side 126 of the vertical member of the "L" shaped part 2R which is a general cuboid with round corners. Therefore, the seat 80M is able to settle between the right side support 10R and the left support 10L. The front support 2R5 supports the front vertical bar 80M5 and horizontal bar 80M4 at their right end 278 and 273. The front support 2R5 contacts the rear side 276 of the front vertical bar 80M5 and also contacts the bottom side 274 of the horizontal front bar 80M4. Referring to FIGS. 7, 8A, and 13, it is also understood that the bottom right support 2R9 supports the rear horizontal bar 80M3 at its right end 265, through a contact from the top surface 281 of the short section 2R91 of the bottom support 2R9 to the bottom surface 268 of the rare horizontal bar 80M3 at the right side 265. It will be appreciated that a similar supporting mechanism is incorporated at the right side of the left support 10L, since the left side support 10L is the mirror image of the right side support 10R. The distance between the handles and the seat support section is sufficient to enable a user's leg to take a forward stride without hitting the seat support section.

Referring to FIGS. 5, 7, 8A, 12, and 13, there is illustrated the attachment of the back support 60M to the right support 10R and left support 10L, and further to the seat 80M. As illustrated in FIG. 5, the back support 60M attaches to the seat 80M, wherein the right convex rod 60M1 at the bottom side 241 downwardly contacts the right curved rod 80M1 at the rear upward side 253. As illustrated in FIGS. 7, 8A, and 12, the bottom horizontal cubic rod 60M4 at the right end through the back side 269 leans against the front surface 282 of the ascending part 2R92 of the bottom support 2R9. As further illustrated in FIGS. 7 and 12, the upper horizontal bar 60M3 of the back support 60M is supported by the upper support 2R15 which is horizontally located on the left side 125 of the "L" shaped part 2R, wherein the top surface 285 of the upper support 2R15 upwardly supports the bottom surface 286 at the right end 246 of the top elongated horizontal cubic bar 60M3. The above discloses mechanisms to attach the back support 60M to the left side 125 of the "L" shaped part 2R of the right side support 10R, and right rear end of the seat 80M. It will be appreciated that the back support 60M is able to attach the left side support 10L and the left rear end of the seat 80M in the same way as disclosed above.

Figure 14A:
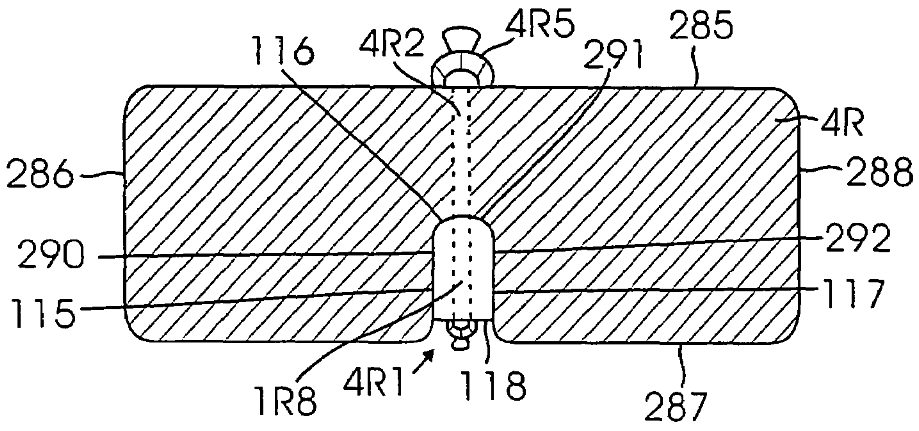
FIG. 14A is a cross sectional view of a wide armrest of the present invention walking chair, wherein the wide armrest is placed horizontally for resting a person's arm when the person is seating in the chair.

Referring to FIGS. 1, 3A, 14A, and 14B, there is illustrated the structure and application of a wide-armrest 4R, a unique part of the present invention walking chair 1. As illustrated in the cross-sectional view of FIG. 14A, the wide armrest 4R is located where a body part 1R10 of the "y" shaped part 2R supports the wide armrest 4R by residing inside of a cavity 4R1 of the wide armrest, and the size of the cross-section of the cavity matches the size of the body part 1R10. Said body part 1R10 shown in FIG. 3A is a segment of the slightly convex body of the "y" shaped part 1R, wherein the body part 1R10 starts at the position 147 and ends at the bottom end 122 of the "y" shaped part 1R. It will be appreciated that the body part 1R10 acts as a front arm. Referring to FIGS. 3A, 7 and 1, there is illustrated the body part 1R10 comprising a right side 115, a top convex side 116, a left side 117, and a bottom side 118. Further as illustrated in FIG. 14A, the wide armrest 4R is a general cuboid, wherein a top rectangular surface 285 of the armrest is placed parallel to the direction of the top surface 116 of the body part 1R10, a right side rectangular surface 286 and the left side 288 are respectively aligned to the right side 115 and left side 117 of the body part 1R10 and further oriented vertically relative to the ground. A cavity opens to a bottom side 287 of the armrest. The cavity 4R1 is an elongated one, comprising a right side 290 and left side 292 parallel to the right side 286. The cavity 4R1 is perpendicular to the bottom side 287 of the armrest 4R and has a top concave surface 291 parallel to the top 285. An elongated center plane of the cavity 4R1 is parallel to both the right side 286 and the left side 288 of the armrest, and is aligned with a center plane of the wide armrest 4R.

Figure 14B:
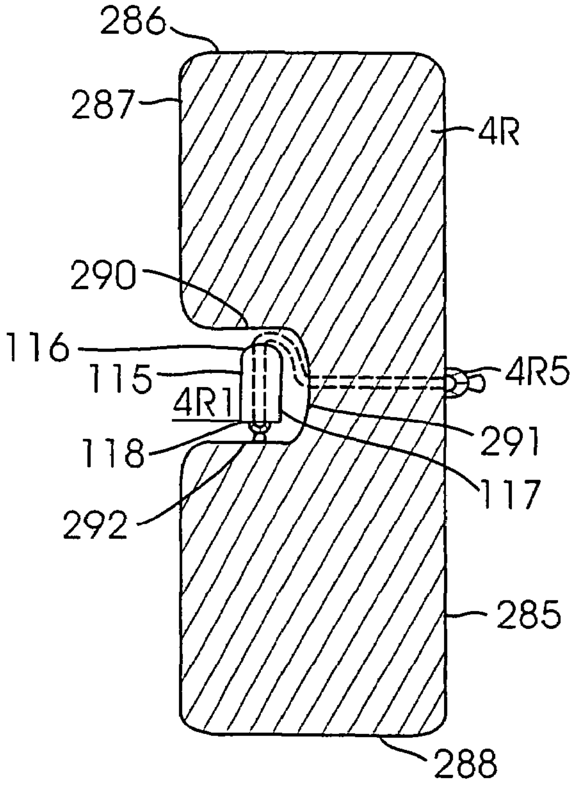
FIG. 14B is a cross section of a wide armrest of the walking chair of the present invention, wherein the wide armrest is placed vertically for reducing the width of the chair so that the chair can easily to pass through a narrow entrance including gates and doors.

Referring to FIGS. 3A and 5, there is illustrated a first hole 1R8 that perpendicularly penetrates through the body part 1R10 at a position 138 close to an open end that is the bottom end 122 of the "y" shaped part 1R. Similarly, a second hole 1R9 is at a position 139 close to the position 147. Therefore, a length of the wide armrest 4R is longer than the length determined by the two holes 1R8 and 1R9. Referring to FIG. 14A again, there is illustrated the connection of the wide armrest 4R onto the body part 1R10, wherein two holes 4R2 and 4R3 (not shown) are drawn perpendicularly to the top surface 285 and respectively throughout the armrest to connect the first hole 1R8 and the second hole 1R9 of the body part. After the wide armrest 4R is first appropriately placed onto the body 1R10 of the "y" shaped part 1R, including having the front of the armrest aligned to the front end 122 of the body part 1R10, then the body of the armrest covers both of the two holes. The top surface of the cavity matches the top surface of the body part, and the side surface of the armrest is perpendicular to the ground. After the holes are created, one rubber cord 4R5 with a knot at one end is used so that the other end of the rubber cord penetrates through the hole 4R2 in the armrest and continues through the hole 1R8 in the body part. The rubber cord 4R5 is stretched, and then a second knot is made, and finally the extra length of rubber cord is cut off. Thus the wide armrest 4R is stabilized on the body part 1R10 of the "y" shaped part 1R of the walking chair. Following this procedure, the second rubber cord is used to link the hole 4R3 (not shown) of the armrest and the hole 1R9 of the body part for the same purpose. As previously illustrated, the present invention unique walking chair 1 provides a user friendly condition and effective ergonomics for the user. The wide armrest with wide size and an appropriate ascending angle provides comfort for the user. However, the wide size of the armrest increases bulkiness of the chair and may create a problem in that the walking chair may be unable to pass through a standard 30" wide door when the wide armrest is horizontally placed shown in FIG. 14A. The problem is resolved by having the wide armrest 4R being rotatable as shown in FIG. 14B so that the wide armrest 4R can be rotated by 90 degrees to be vertically oriented and thereby reduce the horizontal width of the chair to enable it to pass trough a standard 30 inch door. The wide armrest is preferably made with elastic compressible polymer materials and installed with the rubber cords disclosed above. Therefore, the wide armrest can easily be turned to be vertically oriented and therefore enables the walking chair to conveniently pass through narrow spaced areas.

In addition to the above rotatable armrest 4R, the present invention unique walking chair 1 posses the advantage of a unique gliding capability when it is folded. The gliding capability is provided from a first side glide of the front glide 2R10, a second side glide of the shoulder glide 2R11, and the extended left end 120 of the "y" shaped part 1R. Referring to FIGS. 1 and 3A, there is illustrated the first side glide 2R10 located at upper front 114 of the right side 124 of the horizontal member of the "L" shaped part 2R, wherein the glide 2R10 has a size defined by a rectangular back side 290, the front side 291, the left side 292, the right 293, and the bottom side 294. Said rectangular back side 290 is placed so as to contact the right side 124 of the right side "L" shaped part 2R with an orientation so that the longer arm is vertically positioned. The first shorter arm is horizontally placed at the top and the second same short arm is horizontally placed at bottom. The front surface 291 starts from the top shorter arm of the rectangular backside 290 with a short section having a downward cylindrical curved plane immediately following a rectangular plane ending with a third shorter arm. The second same short arm and the third short arm form the bottom horizontal rectangular plane 294, wherein the elongated direction of the bottom rectangular plane is horizontal and parallel to the back side plane 290. The left side plane 292 and right side plane 293 are mirror images each other, and are defined by the back side 290, the front side 291, and bottom side 294 of the first side glide of the front glide 2R10.

Further referring to FIGS. 1 and 3A, there is illustrated the second side glide of the shoulder 2R11 located on the right side 124 of the right side "L" shaped part 2R positioned vertically above the top of the hole 2R4. The second glide 2R11 is a cuboid, wherein the length of the cuboid is placed vertically, the width is positioned horizontally, and the height of the cuboid is perpendicular to the right side 124 of the "L" shaped part 2R, wherein the height is the shortest dimension of the cuboid and the length the longest dimension of the cuboid. The second side glide 2R11 has the front end with a front rectangular surface 296, wherein the front end comprises smooth curved vertical and horizontal edges.

Further referring to FIG. 3A, there is illustrated the left end 120 of the "y" shaped part 1R extended over the rear wheel axle 8R28. As illustrated in FIG. 1, the first side glide of the front glide 2R10 and the second glide of the shoulder glide 2R11 have the same thickness as that of the "y" shaped part 1R, and therefore with the aid of the front glide 2R10 and shoulder glide 2R11, the right side positions of the right side support 10R at the front 114 and top 130 are kept at the same level as that of the right side surface 115 of the "y" shaped part 1R. Therefore, with the aid of the side glides having a smooth surface and round edges, plus the extended left end 130 of the "y" shaped part 1R to prevent the rear wheel axle 8R28 that is perpendicular to the floor resisting sliding, the walking chair is easily slid into a narrow area, for example under a rear seat of a mini van, after the walking chair is folded wherein the right side of the right side support touches the floor of the van. It will be appreciated that since the walking chair 1 comprises a left side which is a mirror image of the right side, there is a mirror image set of a left front glide 2L10, a left shoulder glide 2L11, and an extended right end of the "y" shaped part 1L on the left support 10L, wherein the mirror image set supports a smooth sliding of the walking chair 1 after that it is folded and the left side of the left side support 10L touches the floor. The above disclosures illustrate that the present invention walking chair 1 is able to easily slid into a narrow area after it is folded including folding both shoulder arms.

Figure 9:
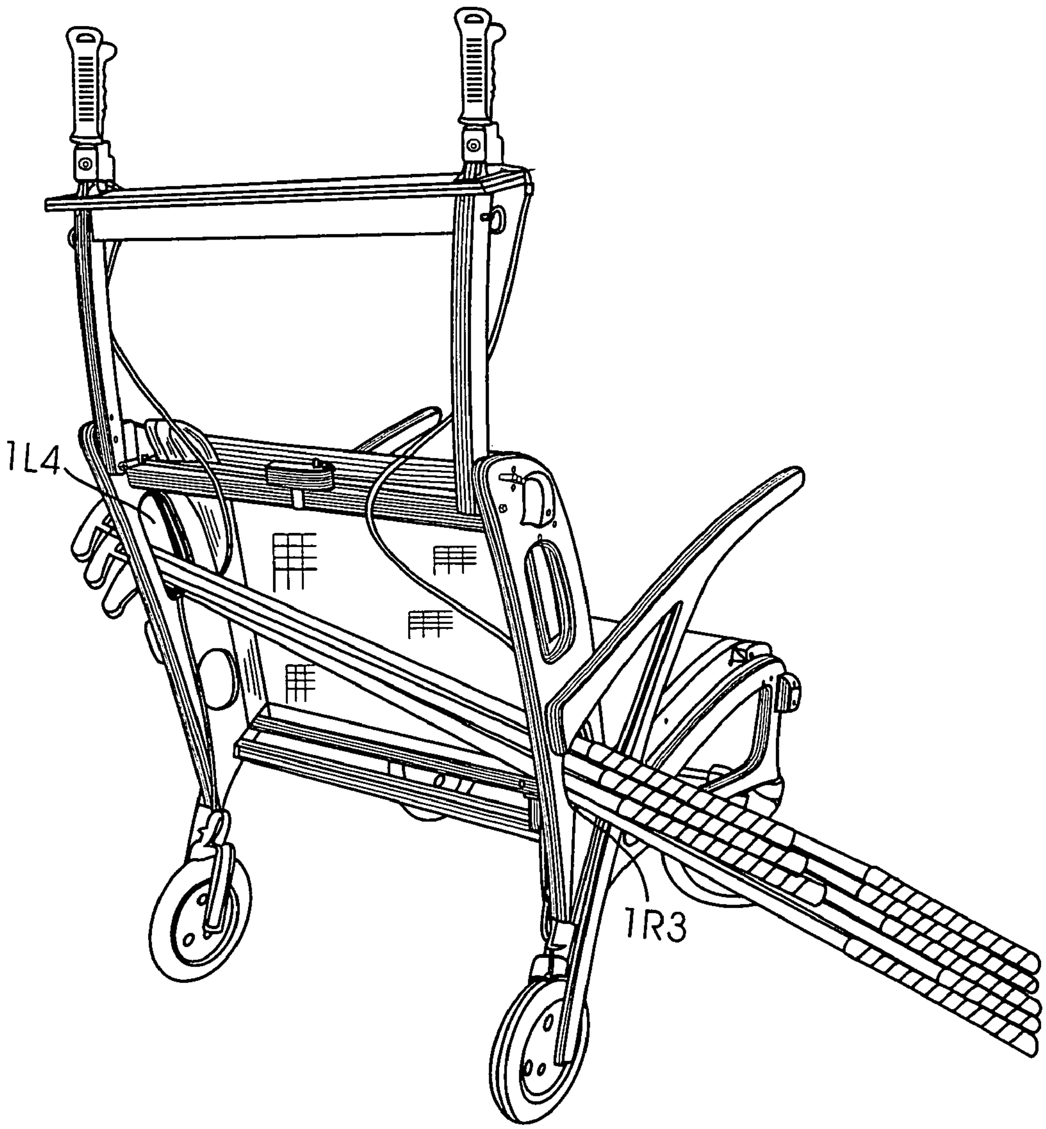
FIG. 9 is a rear perspective view of the present invention walking chair which illustrates the chair in use as a golf club trolley, wherein two foldable shoulder arms of the walking chair are at their elevated positions.

Referring to FIG. 9, there is illustrated the present invention walking chair 1 used as a golf trolley which includes carrying a golf bag with clubs and other golf accessories. As illustrated, a plurality of gulf clubs is supported by the present invention walking chair 1, wherein the golf clubs lie through an upper opening 1L4 of the left side "L" shaped part 2L of the left side support 10L and a bottom hole 1R3 on the right side "L" shaped part 2R of the right support 10R.

Figure 3B:
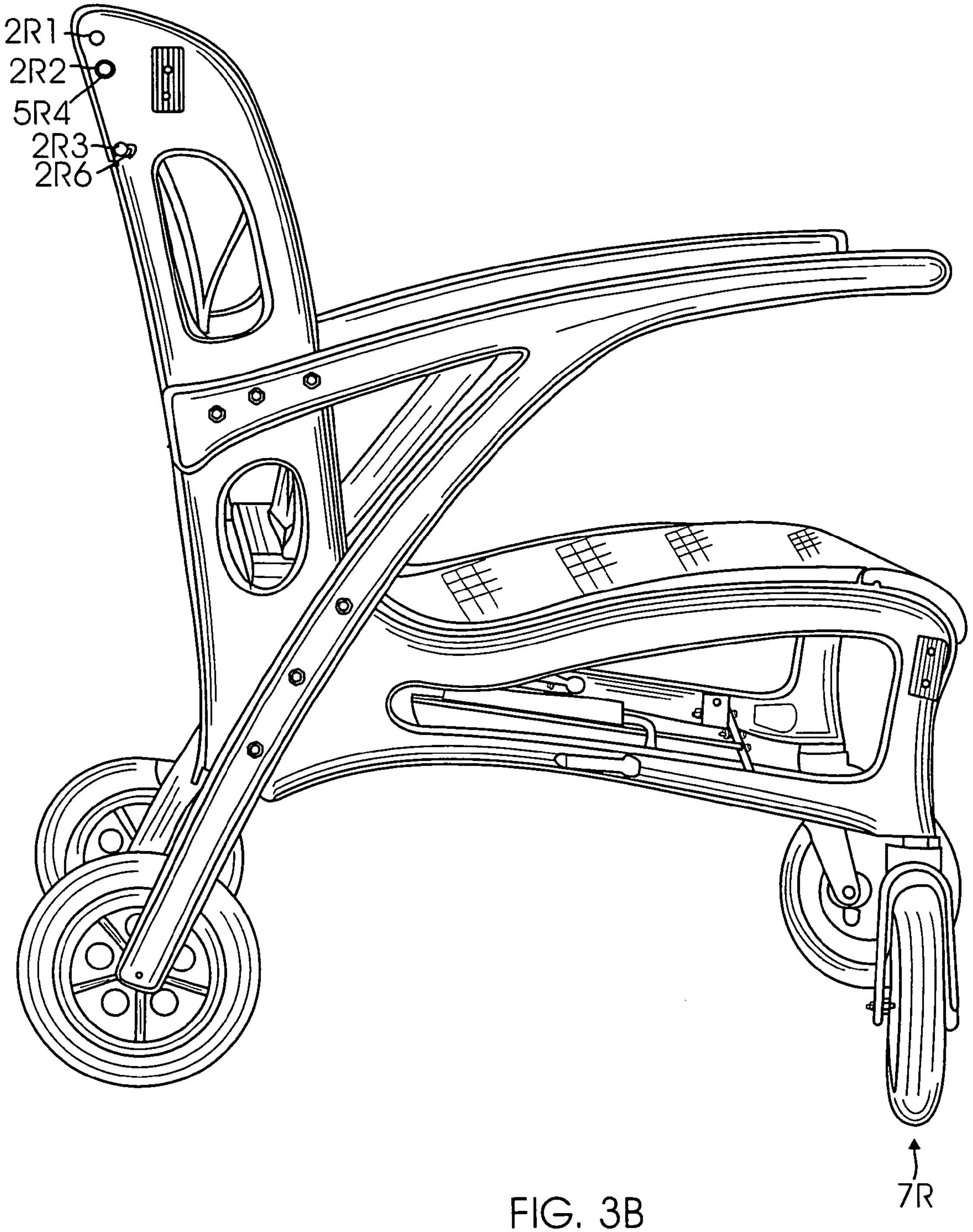
FIG. 3B is a right side perspective view of the present invention walking chair, wherein two foldable shoulder arms of the walking chair are in their folded positions.

Referring to FIG. 3B, there is illustrated the present invention walking chair 1, wherein the rotatable arms 5R and 5L are folded and locked, in contrast their position in FIG. 3A where the arms are rotated to their elevated position with the leaning bar 20M installed. It the configuration of FIG. 3B, the user can comfortably move the walking chair 1 by holding onto the tops of vertical members of the right side and the left side "L" shaped part 2R and 2L, instead of gripping on or leaning against the leaning bar to move the chair. It will also be appreciated that the user also can hold the glide 2R11 and 2L11 of the respective right and left side "L" shaped parts 2R and 2L to move the walking chair 1. Referring to FIG. 3A, there is illustrated the rotatable shoulder arms 5R and 5L at their elevated position, wherein the arms are designed to have a sufficient length so that the leaning bar 30M can be placed at a height that matches the height position of the user's chest. The user then can use his/her chest and/or forearms or hands to push the walking chair 1 forward when the user's chest is positioned against the backside of the leaning bar 20M that is placed between two arms 5R and 5L. The above disclosures illustrate another unique characteristic of the present invention having multiple positions to move the walking chair 1 including pushing it when the arms are folded or elevated and pushing it by leaning on the leaning bar 20M positioned at an adjustable height to accommodate the specific torso height of a given user. The prior art does not includes these features. The present invention also functions as a wheelchair for a person to sit in and be pushed or to move the chair by action of the user's legs. Optionally, footrests 2R20 and 2L20 as illustrated in FIG. 5 can be added.

Referring to FIG. 7, there is illustrated the rear wheel support 8R2, wherein as previously discussed, the length of the support is adjustable so that the level of the seat 80M is also adjustable, which provides a feature to ergonomically fit the user's physical body shape. The wheels are adjustable in cant and height by adding spacers.

Further referring to FIG. 7 in addition to FIG. 3A, there is illustrated the upper wherein each is aligned with a respective vertical portion of the "L" shaped section to which it is rotatably connected, a transverse leaning bar removably attachable between the left and right shoulder arms when they are in their extended condition; (b) left and right generally "y" shaped sections, an upper branch of each section respectively connected to a location on a respective left and right vertical portion of a respective left and right generally "L" shaped section, and a downwardly extending branch respectively connected at a lower portion of a respective left and right vertical portion of a respective left and right generally "L" shaped section and respectively extending downwardly therefrom; (c) each generally horizontal portion of the left and right generally "L" shaped section having an upper section which removably supports a seat frame which retains a horizontal seat, the seat frame retained between the generally horizontal portions, each generally horizontal portion having a lower section which respectively rotatably supports a transverse fold assembly between them, the fold assembly having transverse rods rotatably connected to a respective lower section and rotatably joined at a location between the two lower sections with a rotatable handle member, the transverse rods and rotatable handle rotatable to an orientation aligned with the generally vertical portions of the left and right generally "L" shaped sections when in the closed position, each lower section supporting an inverted generally "U" shaped collar at a location remote from the respective generally vertically extending portion of the left and right generally "L" shaped sections, each generally inverted "U" shaped collar respectively rotatably supporting a front wheel which can horizontally rotate 360 degrees, a bottom brake cable assembly supported on each lower section of the generally horizontal portion of the left and right generally "L" shaped sections, the lower brake assembly having a brake handle and a cable connected to braking means connected to a respective rear wheel so that the walking chair can be braked when a user is in the seated condition, and each lower section respectively supporting an inverted "U" shaped wheel housing at a location adjacent to the respective generally vertically extending portion of the left and right generally "L" shaped sections, which inverted "U" shaped wheel housing respectively supports a left and a right rear wheel, the cable mechanism from a respective upper brake assembly respectively connected to a left and right brake assembly which respectively brakes the left and right rear wheels; (d) each upper branch of the left and right generally "y" shaped sections forming an arm support assembly which respectively extend above a respective upper member of the generally horizontally extending portion of the left and right generally "L" shaped sections, each arm support rotatably supporting a flexible compressible wide armrest, each flexible compressible wide armrest positioned above a respective arm support when in use and rotatable to be vertically aligned with its respective arm support to reduce the width of the walking chair; (e) a backrest supported in a frame assembly which in turn is removably supported between the generally vertically extending portions of the left and right generally "L" shaped sections; (f) at least one of the left and right generally "L" shaped sections supporting a glide assembly which enables the walking chair to be slid on the glide assembly when the walking chair is oriented so that the glide assembly is positioned adjacent a horizontal surface; (g) each vertically extending portion of the left and right generally "L" shaped sections having at least one opening so that objects can be retained between the at least one openings in the vertically extending portions; and (I) the walking chair can be pushed by a user leaning the user's chest against the leaning bar or by the user pushing against the leaning bar with the user's forearms or hands, and the user can rest by leaning against the leaning bar with the rear wheels locked by the upper braking mechanism.

Defined broadly, the present invention is a walking chair, comprising a: (a) a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in handle bar shaped in the form of a trekking pole and including an upper brake assembly including an upper brake handle and a cable extending therefrom, a right shoulder arm rotatably connected to and extending vertically from a location adjacent an upper end of the vertical portion of the right frame member which terminates in handle bar shaped in the form of a trekking pole and including an upper brake assembly including an upper brake handle and a cable extending therefrom, the two shoulder arms rotatable to an extended condition above the vertically extending portions and rotatable to a folded condition wherein each is aligned with a respective vertically extending portion, a transverse leaning bar removably attachable between the left and right shoulder arms when they are in their extended condition; (b) the generally horizontally extending portions of the left and right frame members respectively supporting a left and right rear wheel at a location adjacent the vertically extending portions, the cable mechanism from a respective upper brake assembly respectively connected to a left and right brake assembly which respectively brakes the left and right rear wheels, the horizontally extending portions also rotatably supporting left and right front wheels which can rotate 360 degrees, the front wheels being at a location remote from the vertically extending portions; (c) the generally horizontally extending portions of the left and right frame members removably supporting a horizontal seat; (d) left and right transverse frame members respectively attached to the left and right vertically extending portions of the frame members, each left and right transverse frame member including an arm support rotatably supporting a flexible compressible wide armrest, each flexible compressible wide armrest positioned above a respective arm support when in use and rotatable to be vertically aligned with its respective armrest to reduce the width of the walking chair; and (e) a backrest removably supported between generally vertically extending portions of the left and right frame sections.

Defined more broadly, the present invention is a walking chair, comprising: (a) a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in handle bar shaped in the form of a trekking pole, a right shoulder arm rotatably connected to and extending vertically from a location adjacent an upper end of the vertical portion of the right frame member which terminates in handle bar shaped in the form of a trekking pole, the two shoulder arms rotatable to an extended condition above the vertically extending portions and rotatable to a folded condition wherein each is aligned with a respective vertically extending portion; (b) the generally horizontally extending portions of the left and right frame members respectively supporting a left and right rear wheel at a location adjacent the vertically extending portions, the horizontally extending portions also rotatably supporting left and right front wheels which can rotate 360 degrees, the front wheels being at a location remote from the vertically extending portions; (c) the generally horizontally extending portions of the left and right frame members removably supporting a horizontal seat; (d) left and right transverse frame members respectively attached to the left and right vertically extending portions of the frame members, each left and right transverse frame member including an arm support; and (e) a backrest removably supported between generally vertically extending portions of the left and right frame sections.

Defined even more broadly, the present invention is a walking chair, comprising: (a) a chair structure having spaced apart left and right frame members with each member having a generally vertically extending portion and a generally horizontally extending portion, each generally horizontally extending portion respectively supporting left and right rear wheels and supporting horizontally rotatable left and right front wheels, the horizontally extending portions removably supporting a horizontal seat; (b) each horizontally extending portion of the left and right frame member respectively rotatably supporting a transverse fold assembly between them, the fold assembly having transverse rods rotatably connected to a respective horizontally extending portion and rotatably joined at a location between the two horizontally extending portions with a rotatable handle member, the transverse rods and rotatable handle rotatable to an orientation aligned with the generally vertical portions of the left and right frame members when in the closed position; (c) left and right transverse frame members respectively attached to the left and right vertically extending portions of the frame member, each transverse frame member including an arm support; and (d) a backrest removably supported between generally vertically extending portions of the left and right frame members.

Defined even more broadly, the present invention is a walking chair, comprising: (a) a chair structure having spaced apart left and right frame members with each member having a generally vertically extending portion and a generally horizontally extending portion, each generally horizontally extending portion respectively supporting left and right rear wheels and supporting horizontally rotatable left and right front wheels, the horizontally extending portions removably supporting a horizontal seat; (b) left and right transverse frame members respectively attached to the left and right vertically extending portions of the frame member, each transverse frame member including an arm support which rotatably supports a flexible compressible wide armrest, each flexible compressible wide armrest positioned above a respective arm support when in use and rotatable to be vertically aligned with its respective armrest to reduce the width of the walking chair; and (e) a backrest removably supported between generally vertically extending portions of the left and right frame members.

Defined even more broadly, the present invention is a walking chair, comprising: (a) a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in a handle bar, a right shoulder arm rotatably connected to and extending vertically from a location adjacent an upper end of the vertical section of the right frame member which terminates in a handle bar, the two shoulder arms rotatable to an extended condition above the vertically extending portions and rotatable to a folded condition wherein each is aligned with a respective vertically extending portion, a transverse leaning bar removably attachable between the left and right shoulder arms when they are in their extended condition; (b) each generally horizontally extending portion respectively supporting left and right rear wheels and supporting horizontally rotatable left and right front wheels, the horizontally extending portions removably supporting a horizontal seat; (c) left and right transverse frame members respectively attached to the left and right vertically extending portions, each transverse frame member including an arm support; and (e) a backrest removably supported between generally vertically extending portions of the left and right frame sections.

Defined even more broadly, the present invention is a walking chair, comprising: (a) a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in a handle bar, a right shoulder arm rotatably connected to and extending vertically from a location adjacent an upper end of the vertical section of the right frame member which terminates in a handle bar, the two shoulder arms rotatable to an extended condition above the vertically extending portions and rotatable to a folded condition wherein each is aligned with a respective vertically extending portion, a transverse leaning bar removably attachable between the left and right shoulder arms when they are in their extended condition; (b) each generally horizontally extending portion respectively supporting left and right rear wheels and supporting horizontally rotatable left and right front wheels, the horizontally extending portions removably supporting a horizontal seat; (c) left and right transverse frame members respectively attached to the left and right vertically extending portions, each transverse frame member including an arm support; and (d) a backrest removably supported between generally vertically extending portions of the left and right frame sections.

Defined even more broadly, the present invention is a walking chair, comprising: (a) a chair structure having spaced apart left and right frame members with each member having a generally vertically extending portion and a generally horizontally extending portion, each generally horizontally extending portion respectively supporting left and right rear wheels and supporting horizontally rotatable left and right front wheels, the horizontally extending portions removably supporting a horizontal seat, each vertically extending portion extending to a member which supports a handle bar connected to an upper brake assembly, a bottom brake assembly supported on a horizontally extending portion; (b) left and right transverse frame members respectively attached to the left and right vertically extending portions of the frame member, each transverse frame member including an arm support; (c) a backrest removably supported between generally vertically extending portions of the left and right frame members; and (d) the upper brake assembly connected to a cable which in turn is connected to a braking means adjacent the rear wheels and the bottom brake assembly connected to a cable which in turn is connected to braking means adjacent the rear wheels, so that the walking chair can be braked from a standing position or from a seated position.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A walking chair, comprising:

a. a chair structure having spaced apart left and right generally "L" shaped sections with each section having a generally vertically extending portion and a generally horizontally extending portion, a left shoulder arm rotatably connected to and extending vertically from a location adjacent an upper end of the vertical portion of the left generally "L" shaped section which terminates in handle bar shaped in the form of a trekking pole and including an upper brake assembly including an upper brake handle and a cable extending therefrom, a right shoulder arm rotatably connected to and extending vertically from a location adjacent an upper end of the vertical portion of the right generally "L" shaped section which terminates in handle bar shaped in the form of a trekking pole and including an upper brake assembly including an upper brake handle and a cable extending therefrom, the two shoulder arms rotatable to an extended condition above the "L" shaped sections and rotatable to a folded condition wherein each is aligned with a respective vertical portion of the "L" shaped section to which it is rotatably connected, a transverse leaning bar removably attachable between the left and right shoulder arms when they are in their extended condition;

b. left and right generally "y" shaped sections, an upper branch of each section respectively connected to a location on a respective left and right vertical portion of a respective left and right generally "L" shaped section, and a downwardly extending branch respectively connected at a lower portion of a respective left and right vertical portion of a respective left and right generally "L" shaped section and respectively extending downwardly therefrom;

c. each generally horizontal portion of the left and right generally "L" shaped section having an upper section which removably supports a seat frame which retains a horizontal seat, the seat frame retained between the generally horizontal portions, each generally horizontal portion having a lower section which respectively rotatably supports a transverse fold assembly between them, the fold assembly having transverse rods rotatably connected to a respective lower section and rotatably joined at a location between the two lower sections with a rotatable handle member, the transverse rods and rotatable handle rotatable to an orientation aligned with the generally vertical portions of the left and right generally "L" shaped sections when in the closed position, each lower section supporting an inverted generally "U" shaped collar at a location remote from the respective generally vertically extending portion of the left and right generally "L" shaped sections, each generally inverted "U" shaped collar respectively rotatably supporting a front wheel which can horizontally rotate 360 degrees, a bottom brake cable assembly supported on each lower section of the generally horizontal portion of the left and right generally "L" shaped sections, the lower brake assembly having a brake handle and a cable connected to braking means connected to a respective rear wheel so that the walking chair can be braked when a user is in the seated condition, and each lower section respectively supporting an inverted "U" shaped wheel housing at a location adjacent to the respective generally vertically extending portion of the left and right generally "L" shaped sections, which inverted "U" shaped wheel housing respectively supports a left and a right rear wheel, the cable mechanism from a respective upper brake assembly respectively connected to a left and right brake assembly which respectively brakes the left and right rear wheels;

d. each upper branch of the left and right generally "y" shaped sections forming an arm support assembly which respectively extend above a respective upper member of the generally horizontally extending portion of the left and right generally "L" shaped sections, each arm support rotatably supporting a flexible compressible wide armrest, each flexible compressible wide armrest positioned above a respective arm support when in use and rotatable to be vertically aligned with its respective arm support to reduce the width of the walking chair;

e. a backrest supported in a frame assembly which in turn is removably supported between the generally vertically extending portions of the left and right generally "L" shaped sections;

f. at least one of the left and right generally "L" shaped sections supporting a glide assembly which enables the walking chair to be slid on the glide assembly when the walking chair is oriented so that the glide assembly is positioned adjacent a horizontal surface;

g. each vertically extending portion of the left and right generally "L" shaped sections having at least one opening so that objects can be retained between the at least one openings in the vertically extending portions; and I. the walking chair can be pushed by a user leaning the user's chest against the leaning bar or by the user pushing against the leaning bar with the user's forearms or hands, and the user can rest by leaning against the leaning bar with the rear wheels locked by the upper braking mechanism.

2. The walking chair in accordance with claim 1 wherein said transverse leaning bar is removably attachable between the left and right shoulder arms at a location adjacent the upper brake assembly.

3. The walking chair in accordance with claim 1 wherein each handle bar shaped in the form of a trekking pole facilitates gripping in a multiplicity of hand positions.

4. The walking chair in accordance with claim 1 further comprising means for adjusting the height and angle of said seat.

5. The walking chair in accordance with claim 1 wherein the distance between the handles and the seat support section is sufficient to enable a user's leg to take a forward stride without hitting the seat support section.

6. The walking chair in accordance with claim 1 wherein the backrest and seat are removable and the walking chair can be folded into a generally flat condition through actuation of the fold assembly to enable the walking chair to be stowed in a compartment of a vehicle.

7. The walking chair in accordance with claim 1 further comprising footrests to enable a user to comfortably sit in the walking chair.

8. The walking chair in accordance with claim 1 further comprising means to adjust the cant of the seat.

9. The walking chair in accordance with claim 1 further comprising means to adjust the angle of the handle bar.

10. A walking chair, comprising:

a. a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in handle bar shaped in the form of a trekking pole and including an upper brake assembly including an upper brake handle and a cable extending therefrom, a right shoulder arm rotatably connected to and extending vertically from a location adjacent an upper end of the vertical portion of the right frame member which terminates in handle bar shaped in the form of a trekking pole and including an upper brake assembly including an upper brake handle and a cable extending therefrom, the two shoulder arms rotatable to an extended condition above the vertically extending portions and rotatable to a folded condition wherein each is aligned with a respective vertical extending portion, a transverse leaning bar removably attachable between the left and right shoulder arms when they are in their extended condition;

b. the generally horizontally extending portions of the left and right frame members respectively supporting a left and right rear wheel at a location adjacent the vertically extending portions, the cable mechanism from a respective upper brake assembly respectively connected to a left and right brake assembly which respectively brakes the left and right rear wheels, the horizontally extending portions also rotatably supporting left and right front wheels which can rotate 360 degrees, the front wheels being at a location remote from the vertically extending portions;

c. the generally horizontally extending portions of the left and right frame members removably supporting a horizontal seat;

d. left and right transverse frame members respectively attached to the left and right vertically extending portions of the frame members, each left and right transverse frame member including an arm support rotatably supporting a flexible compressible wide armrest, each flexible compressible wide armrest positioned above a respective arm support when in use and rotatable to be vertically aligned with its respective armrest to reduce the width of the walking chair; and e. a backrest removably supported between generally vertically extending portions of the left and right frame sections.

11. A walking chair in accordance with claim 10 further comprising each horizontally extending portion of the left and right frame members respectively rotatably supporting a transverse fold assembly between them, the fold assembly having transverse rods rotatably connected to a respective horizontally extending portion and rotatably joined at a location between the two horizontally extending portions with a rotatable handle member, the transverse rods and rotatable handle rotatable to an orientation aligned with the generally vertically extending portions of the left and right frame members when in the closed position.

12. A walking chair in accordance with claim 10 further comprising a lower brake cable assembly supported on horizontally extending portion of the left and right frame members, the lower brake assembly having a brake handle and a cable connected to braking means connected to a respective rear wheel so that the walking chair can be braked when a user is in the seated condition.

13. A walking chair in accordance with claim 10 further comprising at least one of the left and right frame sections supporting a glide assembly which enables the walking chair to be slid on the glide assembly when the walking chair is oriented so that the glide assembly is positioned adjacent a horizontal surface.

14. A walking chair in accordance with claim 10 further comprising each vertically extending portion of the left and right frame sections having at least one opening so that objects can be retained between the at least one openings in the vertically extending potions.

15. The walking chair in accordance with claim 10 wherein the walking chair can be pushed by a user leaning the user's chest against the leaning bar or by the user pushing against the leaning bar with the user's forearms or hands, and the user can rest by leaning against the leaning bar with the rear wheels locked by the upper braking mechanism.

16. The walking chair in accordance with claim 10 wherein said transverse leaning bar is removably attachable between the left and right shoulder arms at a location adjacent the upper brake assembly.

17. The walking chair in accordance with claim 10 wherein each handle bar shaped in the form of a trekking pole facilitates gripping in a multiplicity of hand positions.

18. The walking chair in accordance with claim 10 further comprising means for adjusting the height and angle of each said seat.

19. The walking chair in accordance with claim 10 wherein the distance between the handles and the seat section is sufficient to enable a user's leg to take a forward stride without hitting the seat section.

20. The walking chair in accordance with claim 11 wherein the backrest and seat are removable and the walking chair can be folded into a generally flat condition through actuation of the fold assembly to enable the walking chair to be stowed in a compartment of a vehicle.

21. The walking chair in accordance with claim 10 further comprising footrests to enable a user to comfortably sit in the walking chair.

22. The walking chair in accordance with claim 10 further comprising means to adjust the cant of the seat.

23. The walking chair in accordance with claim 10 further comprising means to adjust the angle of the handle bars.

24. A walking chair, comprising:

a. a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in handle bar shaped in the form of a trekking pole, a right shoulder arm rotatably connected to and extending vertically from a location adjacent an upper end of the vertical portion of the right frame member which terminates in handle bar shaped in the form of a trekking pole, the two shoulder arms rotatable to an extended condition above the vertically extending portions and rotatable to a folded condition wherein each is aligned with a respective vertically extending portion;

b. the generally horizontally extending portions of the left and right frame members respectively supporting a left and right rear wheel at a location adjacent the vertically extending portions, the horizontally extending portions also rotatably supporting left and right front wheels which can rotate 360 degrees, the front wheels being at a location remote from the vertically extending portions;

c. the generally horizontally extending portions of the left and right frame members removably supporting a horizontal seat;

d. left and right transverse frame members respectively attached to the left and right vertically extending portions of the frame members, each left and right transverse frame member including an arm support; and e. a backrest removably supported between generally vertically extending portions of the left and right frame sections.

25. The walking chair in accordance with claim 24 wherein each handle bar facilitates gripping in a multiplicity of hand positions.

26. The walking chair in accordance with claim 24 further comprising an upper brake assembly including an upper brake handle and cable respectively extending from each handle bar to braking means adjacent a respective left and right rear wheel.

27. The walking chair in accordance with claim 24 further comprising a removable transverse leaning bar attached between the left and right shoulder arms when they are in their extended condition.

28. The walking chair in accordance with claim 27 wherein said removable leaning bar is positioned adjacent the handle bars.

29. A walking chair in accordance with claim 24 further comprising each horizontally extending portion of the left and right frame members respectively rotatably supporting a transverse fold assembly between them, the fold assembly having transverse rods rotatably connected to a respective horizontally extending portion and rotatably joined at a location between the two horizontally extending portions with a rotatable handle member, the transverse rods and rotatable handle rotatable to an orientation aligned with the generally vertically extending portions of the left and right frame members when in the closed position.

30. A walking chair in accordance with claim 24 further comprising a lower brake cable assembly supported on horizontally extending portion of the left and right frame members, the lower brake assembly having a brake handle and a cable connected to braking means connected to a respective rear wheel so that the walking chair can be braked when a user is in the seated condition.

31. A walking chair in accordance with claim 24 further comprising at least one of the left and right frame sections supporting a glide assembly which enables the walking chair to be slid on the glide assembly when the walking chair is oriented so that the glide assembly is positioned adjacent a horizontal surface.

32. The walking chair in accordance with claim 24 further comprising each vertically extending portion of the left and right frame sections having at least one opening so that objects can be retained between the at least one openings in the vertically extending potions.

33. The walking chair in accordance with claim 27 wherein the walking chair can be pushed by a user leaning the user's chest against the leaning bar or by the user pushing against the leaning bar with the user's forearms or hands, and the user can rest by leaning against the leaning bar with the rear wheels locked by the upper braking mechanism.

34. The walking chair in accordance with claim 24 further comprising means for adjusting the height and angle of said seat.

35. The walking chair in accordance with claim 24 wherein the distance between the handles and the seat section is sufficient to enable a user's leg to take a forward stride without hitting the seat section.

36. The walking chair in accordance with claim 24 wherein the backrest and seat are removable and the walking chair can be folded into a generally flat condition through actuation of the fold assembly to enable the walking chair to be stowed in a compartment of a vehicle.

37. The walking chair in accordance with claim 24 further comprising footrests to enable a user to comfortably sit in the walking chair.

38. The walking chair in accordance with claim 24 further comprising means to adjust the cant of the seat.

39. The walking chair in accordance with claim 24 further comprising means to adjust the angle of the handle bars.

40. A walking chair in accordance with claim 24, further comprising the arm support of each left and right horizontally extending portion rotatably supporting a flexible compressible wide armrest, each flexible compressible wide armrest positioned above a respective arm support when in use and rotatable to be vertically aligned with its respective armrest to reduce the width of the walking chair.

41. A walking chair, comprising:

a. a chair structure having spaced apart left and right frame members with each member having a generally vertically extending portion and a generally horizontally extending portion, each generally horizontally extending portion respective supporting left and right rear wheels and supporting horizontally rotatable left and right front wheels, the horizontally extending portions removably supporting a horizontal seat;

b. each horizontally extending portion of the left and right frame member respectively rotatably supporting a transverse fold assembly between them, the fold assembly having transverse rods rotatably connected to a respective horizontally extending portion and rotatably joined at a location between the two horizontally extending portions with a rotatable handle member, the transverse rods and rotatable handle rotatable to an orientation aligned with the generally vertical portions of the left and right frame members when in the closed position;

c. left and right transverse frame members respectively attached to the left and right vertically extending portions of the frame members, each transverse frame member including an arm support; and d. a backrest removably supported between generally vertically extending portions of the left and right frame members.

42. A walking chair in accordance with claim 41, further comprising a left shoulder arm rotatably connected to and extending vertically from a location adjacent an upper end of the vertical portion of the left frame member which terminates in a handle bar, a right shoulder arm rotatably connected to and extending vertically from a location adjacent an upper end of the vertical section of the right frame member which terminates in a handle bar, the two shoulder arms rotatable to an extended condition above the vertically extending portions and rotatable to a folded condition wherein each is aligned with a respective vertically extending portion.

43. A walking chair, comprising:

a. a chair structure having spaced apart left and right frame members with each member having a generally vertically extending portion and a generally horizontally extending portion, each generally horizontally extending portion respective supporting left and right rear wheels and supporting horizontally rotatable left and right front wheels, the horizontally extending portions removably supporting a horizontal seat;

b. left and right transverse frame members respectively attached to the left and right vertically extending portions of the frame member, each transverse frame member including an arm support which rotatably supports a flexible compressible wide armrest, each flexible compressible wide armrest positioned above a respective arm support when in use and rotatable to be vertically aligned with its respective armrest to reduce the width of the walking chair; and e. a backrest removably supported between generally vertically extending portions of the left and right frame members.

44. A walking chair, comprising:

a. a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in a handle bar, a right shoulder arm rotatably connected to and extending vertically from a location adjacent an upper end of the vertical section of the right frame member which terminates in a handle bar, the two shoulder arms rotatable to an extended condition above the vertically extending portions and rotatable to a folded condition wherein each is aligned with a respective vertically extending portion, a transverse leaning bar removably attachable between the left and right shoulder arms when they are in their extended condition;

b. each generally horizontally extending portion respective supporting left and right rear wheels and supporting horizontally rotatable left and right front wheels, the horizontally extending portions removably supporting a horizontal seat;

c. left and right transverse frame members respectively attached to the left and right vertically extending portions, each transverse frame member including an arm support; and e. a backrest removably supported between generally vertically extending portions of the left and right frame sections.

45. A walking chair, comprising:

a. a chair structure having spaced apart left and right frame members with each member having a generally vertically extending portion and a generally horizontally extending portion, a left shoulder arm rotatably connected to and extending vertically from a location adjacent an upper end of the vertical portion of the left frame member which terminates in a handle bar, a right shoulder arm rotatably connected to and extending vertically from a location adjacent an upper end of the vertical section of the right frame member which terminates in a handle bar, the two shoulder arms rotatable to an extended condition above the vertically extending portions and rotatable to a folded condition wherein each is aligned with a respective vertically extending portion, a transverse leaning bar removably attachable between the left and right shoulder arms when they are in their extended condition;

b. each generally horizontally extending portion respectively supporting left and right rear wheels and supporting horizontally rotatable left and right front wheels, the horizontally extending portions removably supporting a horizontal seat;

c. left and right transverse frame members respectively attached to the left and right vertically extending portions, each transverse frame member including an arm support; and d. a backrest removably supported between generally vertically extending portions of the left and right frame sections.

46. A walking chair, comprising:

a. a chair structure having spaced apart left and right frame members with each member having a generally vertically extending portion and a generally horizontally extending portion, each generally horizontally extending portion respective supporting left and right rear wheels and supporting horizontally rotatable left and right front wheels, the horizontally extending portions removably supporting a horizontal seat, each vertically extending portion extending to a member which supports a handle bar connected to an upper brake assembly, a bottom brake assembly supported on a horizontally extending portion;

b. left and right transverse frame members respectively attached to the left and right vertically extending portions of the frame member, each transverse frame member including an arm support;

c. a backrest removably supported between generally vertically extending portions of the left and right frame members; and f. the upper brake assembly connected to a cable which in turn is connected to a braking means adjacent the rear wheels and the bottom brake assembly connected to a cable which in turn is connected to braking means adjacent the rear wheels, so that the walking chair can be braked from a standing position or from a seated position.

* * * * *